United States Patent [19]
Sonoda et al.

[11] Patent Number: 6,020,943
[45] Date of Patent: Feb. 1, 2000

[54] DISPLAY DEVICE HAVING A DISPLAY PLATE WITH A PLURALITY OF OPENINGS FORMED THEREIN, DISPOSED ABOVE AN EL LIGHT EMITTING MEMBER

[75] Inventors: Hiroyuki Sonoda, Ome; Norihisa Usui, Higashimurayama; Shunji Minami; Koji Namiki, both of Fussa, all of Japan

[73] Assignee: Casio Computer Co., Ltd., Tokyo, Japan

[21] Appl. No.: 09/174,963

[22] Filed: Oct. 19, 1998

Related U.S. Application Data

[62] Division of application No. 08/889,428, Jul. 8, 1997, Pat. No. 5,880,796.

[30] Foreign Application Priority Data

Aug. 8, 1996 [JP] Japan ................................ 8-209855
Dec. 7, 1996 [JP] Japan ................................ 8-183320

[51] Int. Cl.[7] ........................... G02F 1/1335; G04B 1/00; G04B 19/30; G04B 37/00
[52] U.S. Cl. .............. 349/61; 349/12; 368/205; 368/68; 368/88
[58] Field of Search ............... 349/12, 61; 368/205, 368/68, 88

[56] References Cited

U.S. PATENT DOCUMENTS

| | | | |
|---|---|---|---|
| 4,580,877 | 4/1986 | Washo | 349/69 |
| 4,812,634 | 3/1989 | Ohta et al. | 235/492 |
| 4,940,313 | 7/1990 | Hamatani | 349/116 |
| 4,990,900 | 2/1991 | Kikuchi | 340/712 |
| 5,192,944 | 3/1993 | Otsuki et al. | 340/765 |
| 5,677,744 | 10/1997 | Yoneda et al. | 349/12 |
| 5,703,837 | 12/1997 | Umemoto et al. | 368/88 |
| 5,741,369 | 4/1998 | Yamamura et al. | 136/251 |
| 5,742,367 | 4/1998 | Kozaki | 349/116 |
| 5,761,158 | 6/1998 | Azuma et al. | 368/205 |
| 5,841,738 | 11/1998 | Kamei et al. | 368/205 |

FOREIGN PATENT DOCUMENTS

| | | |
|---|---|---|
| 2-181131 | 7/1990 | Japan . |
| 5-261180 | 10/1993 | Japan . |
| 5-265382 | 10/1993 | Japan . |

*Primary Examiner*—William L. Sikes
*Assistant Examiner*—Tarifur R. Chowdhury
*Attorney, Agent, or Firm*—Frishauf, Holtz, Goodman, Langer & Chick, P.C.

[57] ABSTRACT

The present invention relates to a display device which is used for various types of electronic apparatuses, e.g., an electronic watch, an electronic pocket notebook, and the like, and an electronic device. In the device or apparatus, a solar battery member having a lot of light passing openings for passing light is provided between a liquid crystal display member and a plate-like light emitting member disposed at a position lower than that of the liquid crystal display member.

15 Claims, 21 Drawing Sheets

DISPLAY DEVICE HAVING A DISPLAY PLATE WITH A PLURALITY OF OPENINGS FORMED THEREIN, DISPOSED ABOVE AN EL LIGHT EMITTING MEMBER

This is a division of application Ser. No. 08/889,428 filed Jul. 8, 1997, now U.S. Pat. No. 5,880,796 issued on Mar. 9, 1996.

BACKGROUND OF THE INVENTION

The present invention relates to a display device, an electronic device, and a method for manufacturing an electronic device, which are useful for applying to various types of electronic apparatuses, e.g., an electronic watch, an electronic pocket notebook, a personal computer, and the like.

Generally, an electronic apparatus, e.g., an electronic watch, an electronic pocket notebook, a personal computer and the like, which comprises a liquid crystal display panel for displaying various types of information, and a light emitting member using electro-luminescence (hereinafter, it may be referred to EL light emitting member) disposed at a position lower than that of the liquid crystal display panel which enables sufficient visual recognition of various types of information shown in the liquid crystal display panel in nighttime and in total darkness by illuminating the liquid crystal display panel with light emitted from the surface of the EL light emitting member is known.

Since the above-described electronic apparatus has a structure in which a solar battery member and the liquid crystal display panel are arranged in parallel, there is the problem of requiring a large surface area of the whole electronic watch, for example, the problem of difficult installation to the arm in a very small-sized electronic apparatus such as an electronic watch and the like.

When the solar battery member and the liquid crystal display panel are arranged in parallel, there is also another problem that an area for display cannot be sufficiently secured and it is difficult to recognize the various types of information visually because the area occupied by the liquid crystal display member is limited and relatively reduced by the occupied area for the solar battery member.

Further, when the solar battery member and the liquid crystal display panel are arranged in parallel, there is also a further problem that the solar battery member which is generally black and is exposed to the surface of the apparatus gives a restriction on design of the apparatus, as a result, a good design cannot be obtained.

SUMMARY OF THE INVENTION

The present invention was developed in view of these problems.

It is an object of the present invention to provide a display device, an electronic device, and a method for manufacturing an electronic device, which can realize clearly an indication of the touch panel or the display member in the nighttime and in total darkness even when a solar battery member is incorporated therein, and which provides an improved apparatus design.

In order to solve the above-described problems, the present invention comprises: a transparent touch panel for a touching operation; a plate-like light emitting member disposed at a position lower than that of the transparent touch panel, for illuminating the transparent touch panel from the lower position; and a plate-like solar battery member disposed between the light emitting member and the transparent touch panel; wherein an opening through which passes light emitted from the light emitting member toward a side of the transparent touch panel and the shape of which is visible from the side of the transparent touch panel, is formed in the solar battery member.

A lot of openings for passing light therethrough are formed in the solar battery member.

A typical plate-like light emitting member is an EL light emitting member but any type of light emitting member may be used so long as it has a light emitting function, for example, a lamp, a fluorescent lamp or the like.

Further, the plate-like solar battery member functions to perform its photoelectric converting operation and to generate power when receiving light, and the generated power is supplied to respective members including the touch panel and the light emitting member.

The openings include a lot of light-transmissive holes with a small diameter, and ones having shapes of display elements, e.g., of blanked characters, symbols, figures, etc. for indicating various functions of the touch keys for light passage; but any shape of openings may be employed.

As explained above, in accordance with the invention, because the solar battery member having a lot of openings for passing light therethrough are disposed between the transparent touch panel or the liquid crystal display member and the light emitting member, it is possible to visually recognize the indication on the upper surface of the transparent touch panel or the display content of the liquid crystal display member clearly from the outside, of course in daytime, and even in the nighttime and in total darkness. Because the apparatus according to the invention has a structure in which the transparent touch panel or the liquid crystal display member, the solar battery member having a lot of openings for passing light therethrough, and the light emitting member are layered on one another, it is possible to make the whole apparatus small-sized. Even when a black solar battery member is used, because the solar battery member is disposed at a position lower than that of the transparent touch panel or the liquid crystal display member, the solar battery member is not exposed to the surface of the apparatus and it is possible also to improve the design of the device or the apparatus.

BRIEF DESCRIPTION OF THE DRAWINGS

FIGS. 5A, 5B and 5C show an example of manufacturing steps of a solar battery member and the periphery thereof, which are principal parts of a watch shown in FIG. 1; wherein FIG. 5A is a cross-sectional view for showing formation of a transparent electrode, an amorphous silicon layer and a metallic electrode, on a watch glass, FIG. 5B is a cross-sectional view of a principal part for showing formation of a resist layer on the metallic electrode, and FIG. 5C is a cross-sectional view of a principal part of the layers structure in which parts of the metallic electrode and of the amorphous silicon layer were removed by an etching process;

PREFERRED EMBODIMENT OF THE INVENTION

Preferred embodiments of a display device in accordance with the present invention will be explained in connection with FIGS. 1 to 28.

First Embodiment

Figure 1:
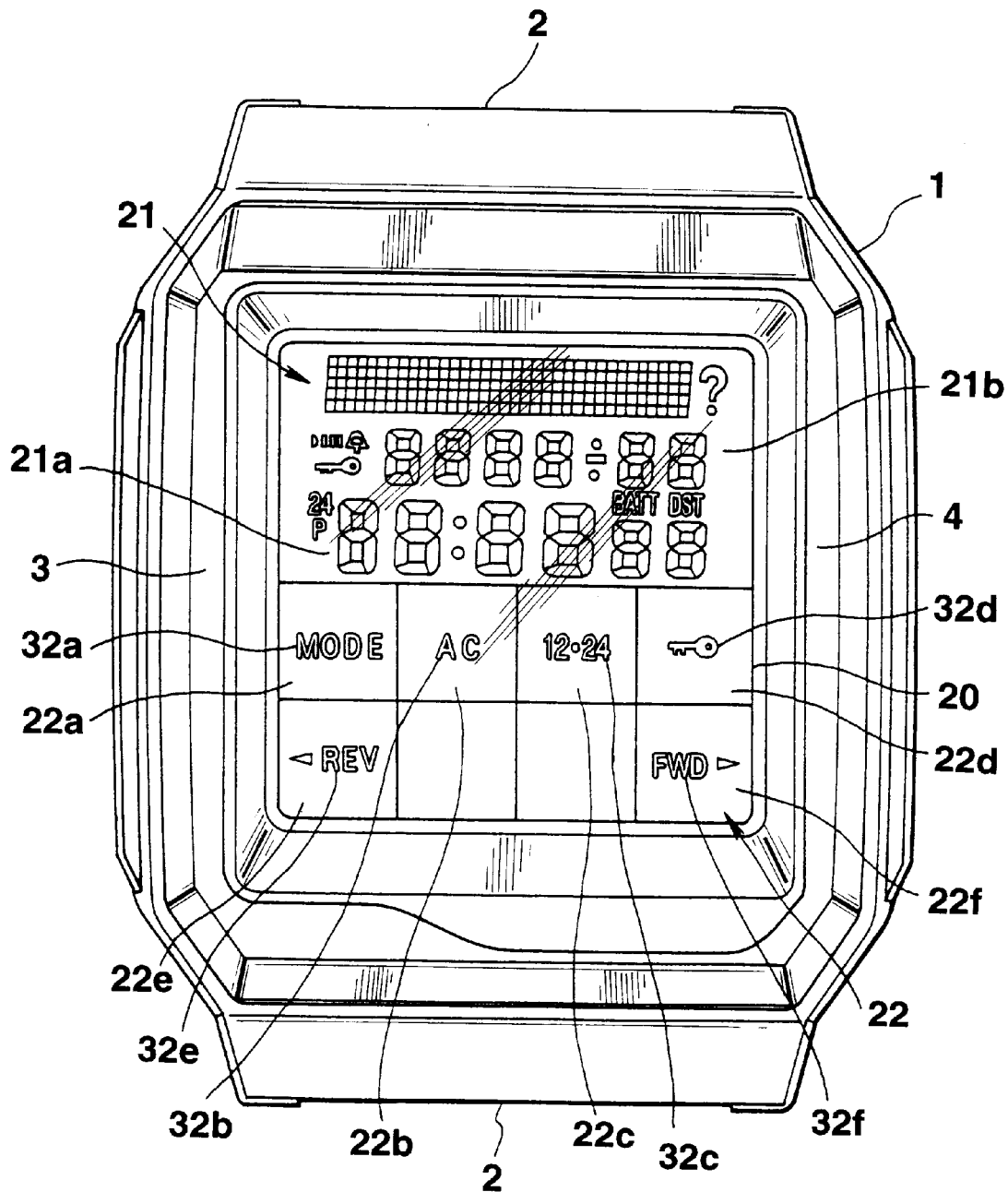
FIG. 1 is a plan view of a first embodiment of the invention which is applied for an electronic watch.
Figure 2:
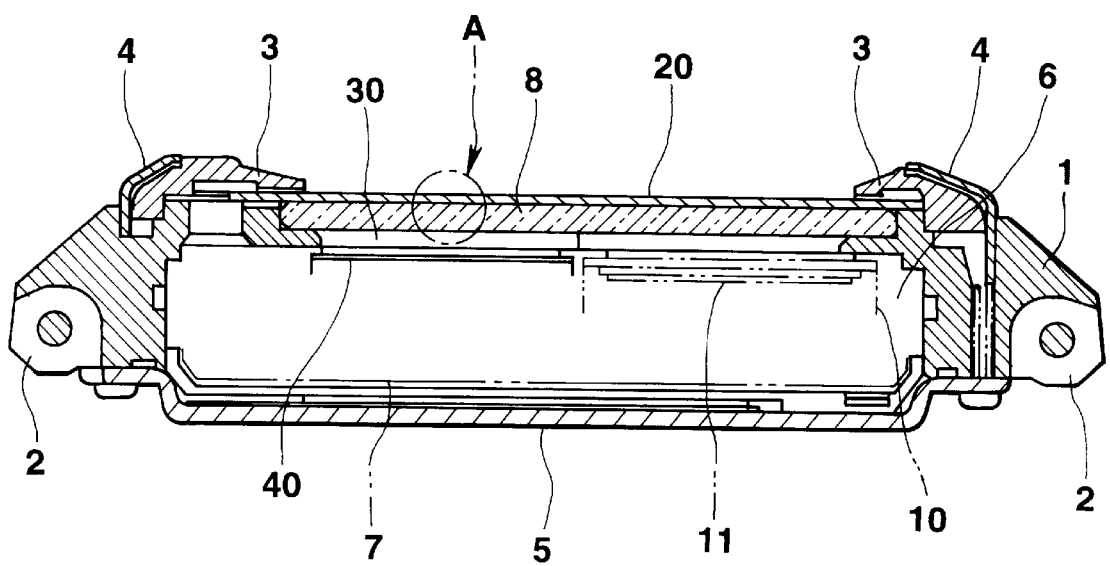
FIG. 2 is a vertical cross-sectional view of the electronic watch shown in FIG. 1.

FIG. 1 is a front view of an electronic watch as an embodiment of an electronic apparatus to which the display device in accordance with the present invention is applied. FIG. 2 is a vertical cross-sectional side view of the same, and FIG. 3 is an enlarged view of a portion denoted by an arrow A in the same.

Figure 3:
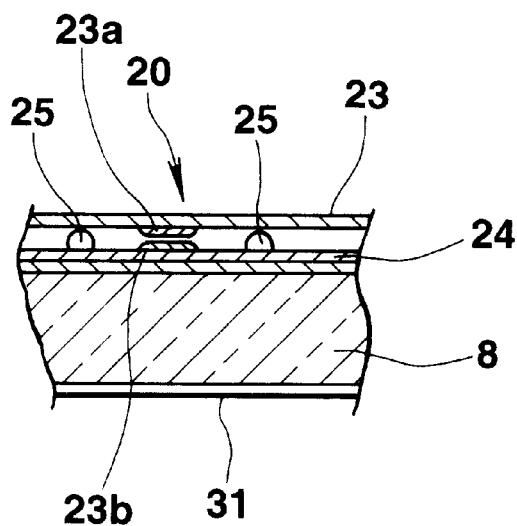
FIG. 3 is an enlarged view of a portion shown by an arrow "A" in FIG. 2.

In FIGS. 1 to 3, reference numeral 1 denotes an apparatus case, numeral 2 denotes a band attachment portion, 3 and 4 denote bezels, 5 denotes a case back, 6 denotes an upper housing, 7 denotes a lower housing, 8 denotes a watch glass, 10 denotes a watch module, 11 denotes a liquid crystal display panel (display member), 20 denotes a transparent touch panel, 21 denotes a digital display part, 21a denotes a time display part, 21b denotes an information display part, 22 denotes a touch operation part, 22a, 22b, 22c, 22d, 22e and 22f denote touch keys, 23 and 24 denote transparent films, 25 denotes a dot spacer, 30 denotes a solar battery member, 32a, 32b, 32c, 32d, 32e and 32f denote openings, and 40 denotes an EL light emitting member.

In this electronic watch, as shown in FIGS. 1 and 2, at the ends of both sides of the apparatus case 1 which also functions as a watch case, the band attachment portions 2 and 2 are provided. At the upper outer peripheral portion of the apparatus case 1, the bezels 3 and 4 for decoration are provided and on the lower surface of the apparatus case 1, the case back 5 is attached.

In the interior of the apparatus case 1, the upper housing 6 and the lower housing 7 are contained. The watch glass 8 is mounted to the upper open surface of the apparatus case 1.

In the interior of the upper housing 6 and the lower housing 7, the module 10 is incorporated. The module 10 comprises the liquid crystal display panel 11 as a display member and a circuit board 11A (which is not shown) disposed at a lower position therof, on the lower surface of the display panel and having an LSI, etc. mounted thereon.

On an upper surface of the watch glass 8, the transparent touch panel 20 is placed and fixed by the bezel 3 at the periphery thereof. The transparent touch panel 20 has the digital display part 21 and the touch operation part 22, which are divided into zones of upper and lower sides, in plan, as shown in FIG. 1.

That is, in FIG. 1, the digital display part 21 of the upper side has the time display part 21a for displaying time by 7 segments, the information display part 21b for displaying information such as a time measured by a stop watch, a calculated result, a previously-stored message, or the like. These display parts are arranged in parallel to each other.

The display of the time display part 21a and the information display part 21b, of the digital display part 21 are carried out by the liquid crystal display panel 11, as shown in FIG. 2.

In FIG. 1, the touch operation part 22 of the lower side has a plurality of (6 in the illustrated example) touch keys 22a, 22b, 22c, 22d, 22e and 22f which are arranged in an array of rows and columns.

In this case, as shown in FIG. 3, the transparent touch panel 20 is made of a pair of flexible transparent films 23 and 24 of polyethylene terephthalate (PET) or the like. On opposing surfaces of the transparent films 23 and 24 in the touch operation part 22, transparent electrodes 23a and 23b of indium tin oxide (ITO) or the like are formed to face to each other, at positions corresponding to the respective touch keys 22a, 22b, 22c, 22d, 22e and 22f.

Also, on the lower transparent film 24, the dot spacers 25 are provided at positions corresponding to the peripheral portions of the transparent electrode 23b. Each of the spacers 25 has an height enough for the transparent electrodes 23a and 23b being usually not in contact with each other.

These dot spacers 25 function to bring the adjacent transparent electrodes 23a and 23b of the touched key into electrically contact with each other at only the time of touching operation of the touch keys 22a, 22b, 22c, 22d, 22e and 22f, and function to prevent mutual electrical contact at the time other than touching operation, to thereby enable accurate key touch.

In the transparent touch panel 20, because no such transparent electrodes like the transparent electrodes 23a and 23b are formed on the opposing surfaces of the transparent films 23 and 24 in the digital display part 21, it is possible to clearly recognize a character, a figure, an icon or the like visually which is displayed on the digital display part 21 through the transparent films 23 and 24, without through transparent electrodes.

On the lower surface of the watch glass 8, the plate-like solar battery member 30 is formed as integrally overlapped with the watch glass at a location corresponding to the touch operation part 22 of the transparent touch panel 20, as shown in FIG. 2.

Figure 5A:
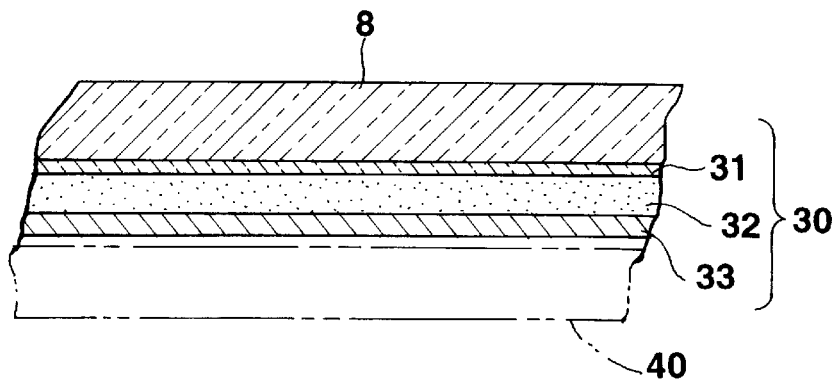
Figure 5B:
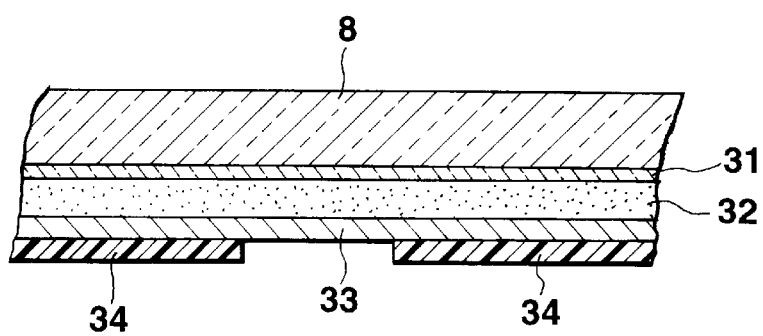
Figure 5C:
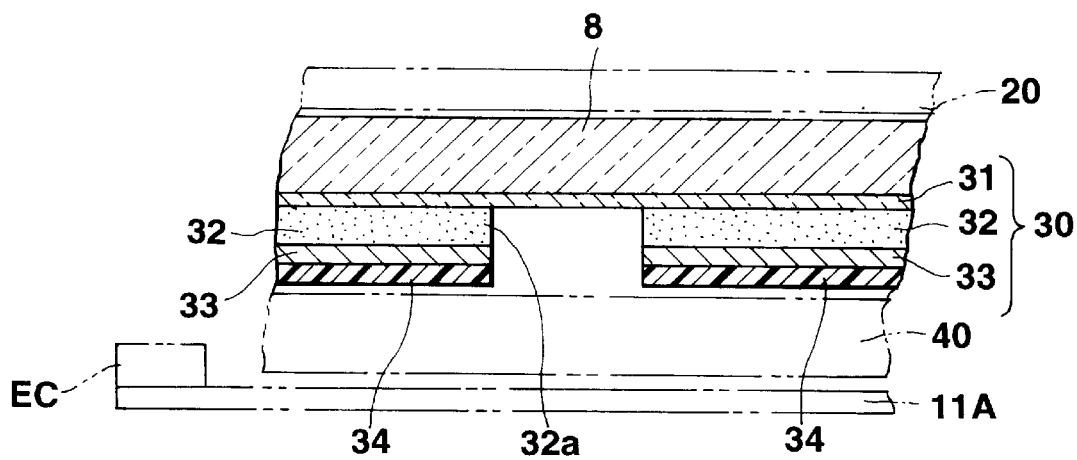

The plate-like solar battery member 30 comprises, as shown in FIGS. 5A to 5C, a pattern of transparent electrode layer 31 of ITO or the like, an amorphous silicon layer 32 formed as stacked on the electrode layer 31, and a metallic electrode layer 33 of aluminum or the like formed on the amorphous silicon layer 32. The solar battery member 30 performs its photoelectric converting operation when the amorphous silicon layer 32 receives light passed through the transparent touch panel 20, watch glass 8 and transparent electrode layer 31.

As shown in FIG. 1, the solar battery member 30 is formed with the blanked openings 32a, 32b, 32c, 32d, 32e and 32f of characters and symbols, indicative of key names or key functions corresponding to the touch keys 22a, 22b, 22c, 22d, 22e and 22f.

Further, at a position lower than that of the plate-like solar battery member 30 having the aforementioned structure, the plate-like EL light emitting member 40 is arranged as attached to the upper housing 6.

To an electronic circuit part EC of a circuit board 11A of the watch module 10, the electrode terminals of the liquid crystal display panel 11, the electrode terminals of the transparent touch panel 20, the electrode terminals of the solar battery member 30, and the electrode terminals of the EL light emitting member 40 are connected respectively by such an electric connecting member as an interconnector.

Formation of the openings 32a, 32b, 32c, 32d, 32e and 32f in the aforementioned plate-like solar battery member 30 is carried out, for example, through the steps shown in FIGS. 5A to 5C.

First of all, the transparent electrode layer 31, the amorphous silicon layer 32 and the metallic electrode layer 33 are sequentially formed as stacked on the lower surface of the watch glass 8, as shown in FIG. 5A.

Next, in such a stacked state, on the lower surface of the metallic electrode layer 33, a predetermined pattern of resist 34 having openings corresponding to the blanked openings 32a, 32b, 32c, 32d, 32e and 32f of characters and symbols to be formed in the solar battery member 30, is formed, as shown in FIG. 5B.

The predetermined pattern of resist 34 having the openings is formed, by evenly coating resist on the lower surface of the metallic electrode layer 33, thereafter subjecting the resist pattern to a light exposure by using light energy (not shown) with use of a photomask (not shown), and then developing the light-exposed resist.

As shown in FIG. 5C, the respective portions of the metallic electrode layer 33 and the amorphous silicon layer 32, corresponding to the openings of the resist layer 34 are removed by etching.

By the removement, the blanked openings 32a, 32b, • each having a desired size come to be formed in the solar battery member 30. Thereafter, the resist layer 34 is released and removed to complete the processing operations.

As described above, in accordance with the electronic watch of this embodiment, in FIG. 1, the transparent touch panel 20 comprising; the digital display part 21 arranged at an upper side thereof and the touch operation part 22 including the touch keys 22a, 22b, 22c, 22d, 22e and 22f, arranged at a lower side thereof, in plan, is used. The digital display part 21 comprises the time display part 21a and the information display part 21b to display them using the liquid crystal display panel 11 provided at a lower position in vertical cross-section. The openings 32a, 32b, 32c, 32d, 32e and 32f of blanked characters and blanked symbols to be indicative of the key names and key functions corresponding to the touch keys 22a, 22b, 22c, 22d, 22e and 22f, are formed in the plate-like solar battery member 30 which is disposed between the touch operation part 22 located in the lower side in plan and the EL light emitting member 40 located at a position lower than that of the touch operation part 22. The light emitted from the EL light emitting member 40 located at the lower position is introduced into the touch operation part 22 which is in the user side, so that the user can look at the shape of the openings from the side of the user-side touch operation part 22. As a result, the electronic watch can have effects (1) to (3), as follows.

(1) Because the transparent touch panel 20 includes the digital display part 21 having the time display part 21a and information display part 21b arranged in parallel, and the touch operation part 22 having the touch keys 22a, 22b, 22c, 22d, 22e and 22f, and the digital display part 21 and touch operation part 22 are arranged side by side, the user can see the parallel-arranged time display part 21a and the information display part 21b in the liquid crystal display panel 11 located at a position lower than that of the digital display part 21.

(2) In the daytime and in bright places, the shapes of the openings 32a, 32b, 32c, 32d, 32e and 32f of the blanked characters and symbols made in the solar battery member 30 located at the position lower than that of the touch operation part 22 can be seen and the function displays of the respective touch keys 22a, 22b, 22c, 22d, 22e and 22f can be read, from the side of the touch operation part 22 of the transparent touch panel 20, thus it is possible to realize easy operation of the touch operation part 22.

(3) In the nighttime and in total darkness, the openings 32a, 32b, 32c, 32d, 32e and 32f of the solar battery member 30 are illuminated through the passage of light emitted from the EL light emitting member 40 located at the lower position thereof, so that the shapes of the openings 32a, 32b, 32c, 32d, 32e and 32f can be seen and the function displays of the touch keys 22a, 22b, 22c, 22d, 22e and 22f can be read with the help of the back-light illumination, from the side of the touch operation part 22 of the transparent touch panel 20, thus it is possible to realize easy operation of the touch operation part 22.

Modified Example

Although the openings 32a, 32b, 32c, 32d, 32e and 32f of the solar battery member 30 have been made to have the blanked shapes of characters and symbols in the foregoing embodiment, the openings are not limited in shape to the characters and symbols but may respectively comprise, for example, a meshed light passage having small holes arranged therein.

With respect to the key names of the touch keys 22a, 22b, 22c, 22d, 22e and 22f, the key names may be given separately from the openings 32a, 32b, 32c, 32d, 32e and 32f. For example, the key names may be given on the upper surface of the watch glass 8 by means of printing or the like.

The structure of the transparent touch panel 20 comprises the pair of transparent films 23 and 24 (refer to FIG. 3) in the foregoing first embodiment, it may comprise a single sheet of the transparent film 23 and the watch glass 8.

Figure 4:
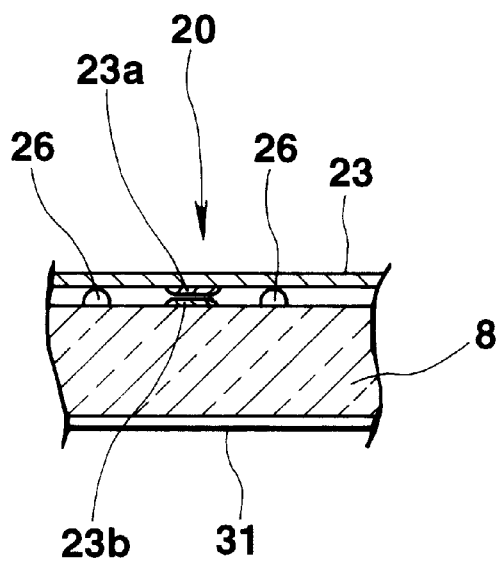
FIG. 4 is an enlarged view of an alternative design of the portion shown by the arrow "A" in FIG. 2.

That is, when the transparent touch panel 20 comprises the single sheet of transparent film 23 and the watch glass 8 as shown in FIG. 4, opposing surfaces of the transparent film 23 and watch glass 8 in the touch operation part 22 are formed with opposing transparent electrodes 23a and 23b of ITO or the like at positions corresponding to the touch keys 22a, 22b, 22c, 22d, 22e and 22f.

On the lower watch glass 8, the dot spacers 26 which are suitable for the peripheral portion of the transparent electrodes 23a and 23b, are formed to have an height enough for the transparent electrodes 23a and 23b being not in contact with each other.

Second Embodiment

Figure 6:
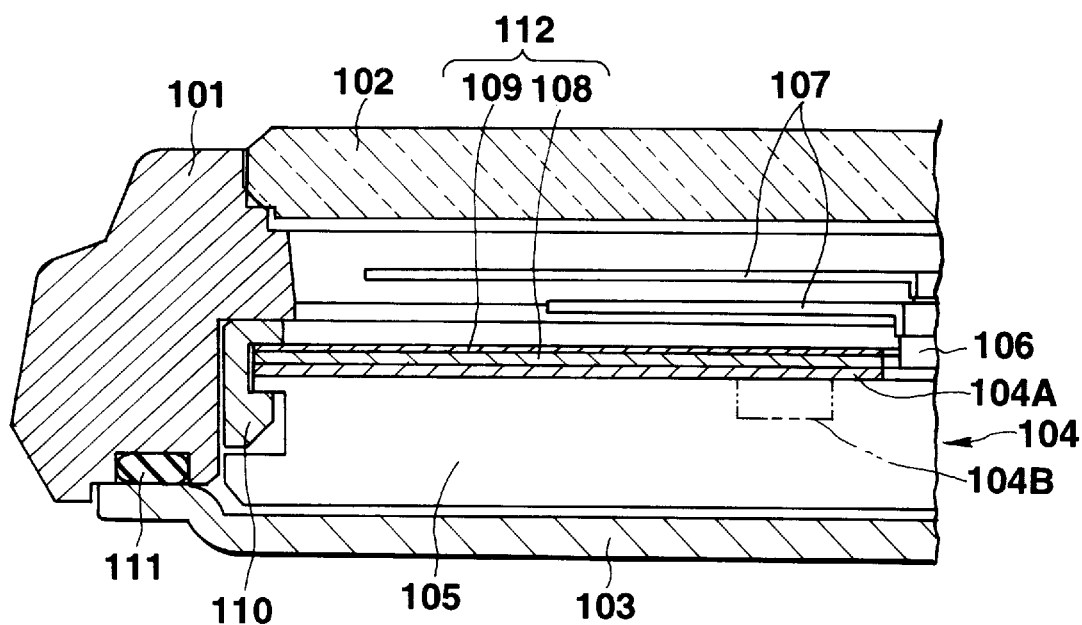
FIG. 6 is a cross-sectional view of a watch for which a second embodiment of the present invention is applied.
Figure 7:
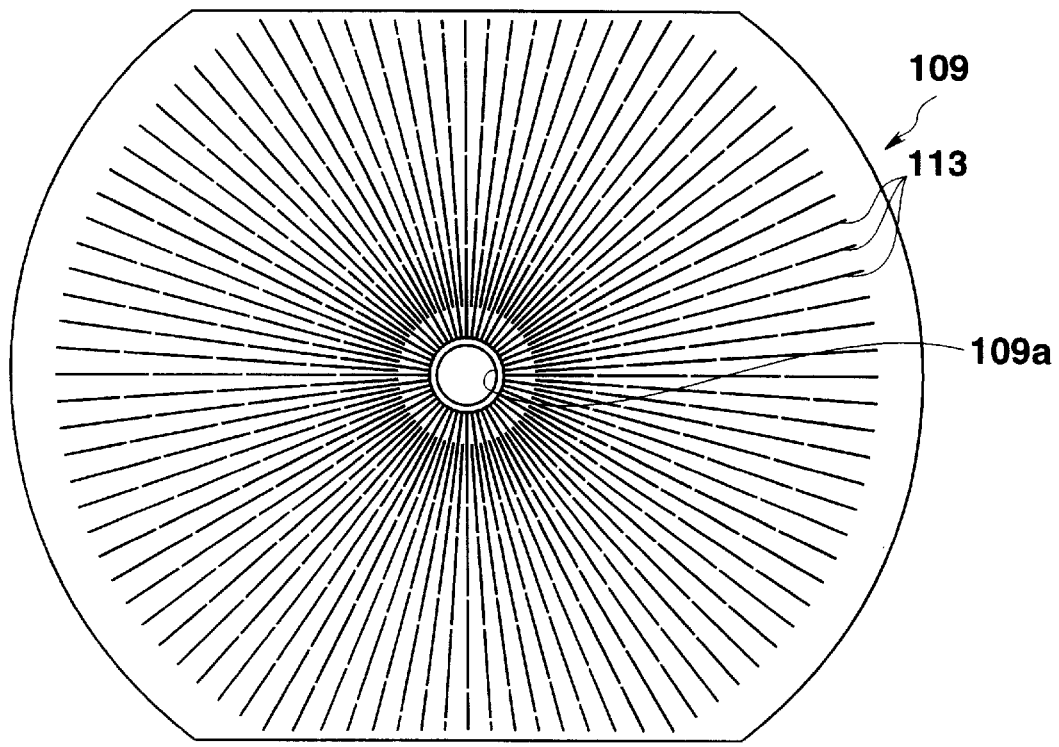
FIG. 7 is a plan view of a display plate provided with outgoing openings therein.
Figure 8:
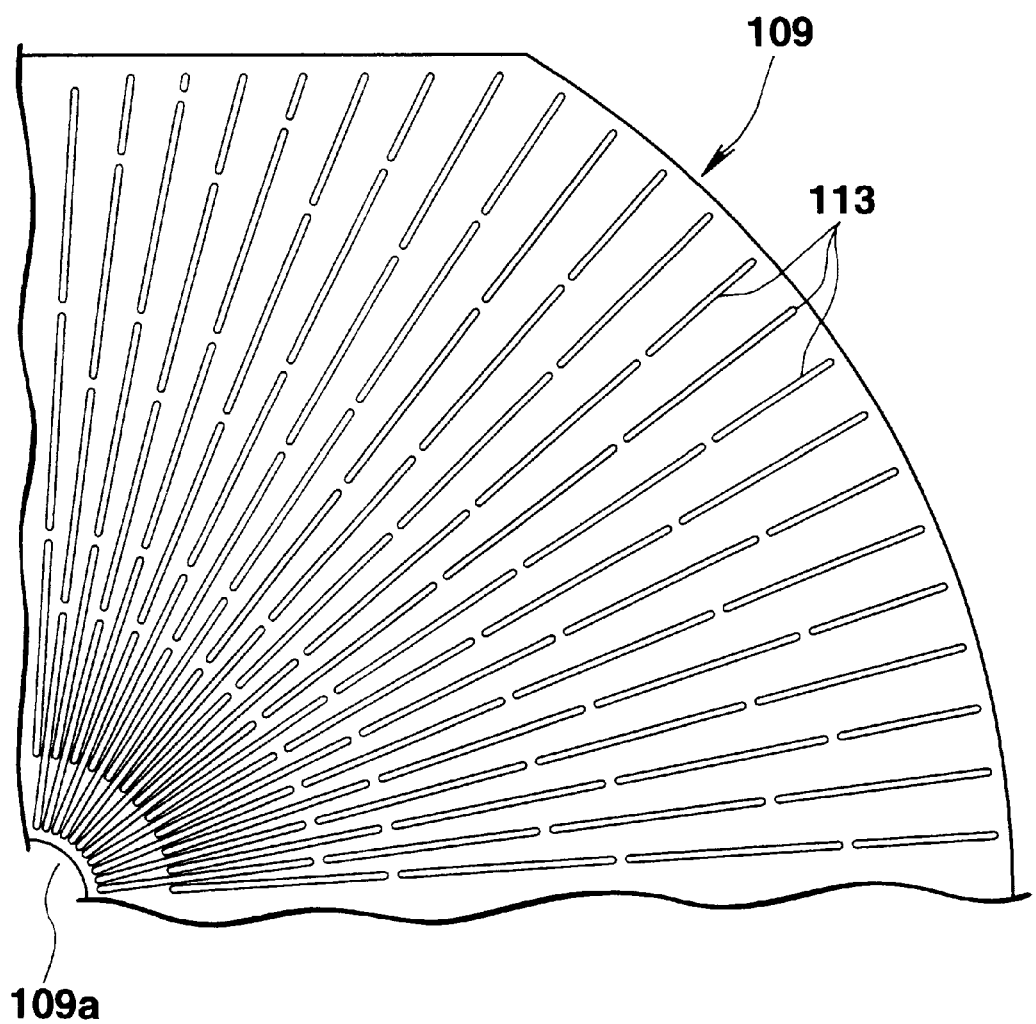
FIG. 8 is an enlarged plan view of FIG. 7.

FIGS. 6 to 8 show a second embodiment of the invention, and FIG. 6 shows an interior structure of a watch to which the second embodiment is applied.

The watch comprises a watch case 101 which has a watch glass 102 attached to the upper portion thereof and a case back 103 attached to the lower portion thereof, and an analog hand mechanism 104 provided in the watch case 101. The analog hand mechanism 104 includes a circuit board 104A, a body part 105 having a battery member, etc. incorporated in a housing thereof, a hand shaft 106 extending upwardly from the central portion of the body part 105, and hands 107 including minute and hour hands attached to the hand shaft 106.

On the upper surface of the body part 105 of the analog hand mechanism 104, an EL light emitting member 108 formed with a plate shape and a display plate 109 are placed in a stacked state. The EL light emitting member 108 and display plate 109 are formed in their center with through holes 108a and 109a, through which the hand shaft 106 passes and extends upwardly. A holding member 110 is one for fixedly holding the display plate 109 by pressing down the periphery thereof, and a sealing member 111 is one for sealing and is provided between the case back 103 and the lower surface of the watch case 101.

In such a structure, the EL light emitting member 108 and the display plate 109 stacked thereon form a dial 112 for the display device, and the EL light emitting member 108 emits light from the surface thereof when receiving a light emitting signal from the power source part 104B provided on the circuit board 104A of the analog hand mechanism 104.

In the display plate 109, at least the upper surface of the upper and lower surfaces is made of a metal layer. For this purpose, for example, the entire display plate may be made of a metallic plate or may be made of a resin plate having a metal-plated layer formed thereon. Further, the metallic plate may be further plated to give a brightness or metallic color. Such characters as time characters or other characters can be printed on the display plate 109, whereby the display plate can function as a dial indicative of time. By forming such a metallic layer at least on the upper surface of the display plate in this way, the display plate can give a metallic impression and thus a high grade feeling to the watch.

FIG. 7 shows the display plate 109 wholly made of metal. In the display plate 109, a lot of elongated outgoing openings 113 are formed to extend radially centered on the through hole 109a. The outgoing narrow openings 113, as shown in FIG. 8, extend in the radial direction of the display plate 109 intermittently.

The outgoing openings 113 having such a configuration are formed by etching the display plate 109.

Such outgoing openings 113 communicate with an optical path (not shown in the drawing) which passes through the display plate 109 in its thickness direction, whereby light emitted from the EL light emitting member 108 located thereunder emits from the outgoing openings 113. The emission of the light enables the entire upper surface of the display plate 109 to be bright, thus realizing easy reading of a time in total darkness or in nighttime. Further, since the outgoing openings 113 are made narrow and have a total area smaller than that of the display plate 109, the provision of the outgoing openings will not deteriorate the metallic impression of the display plate 109.

Another Example of The Display Plate

Figure 9:
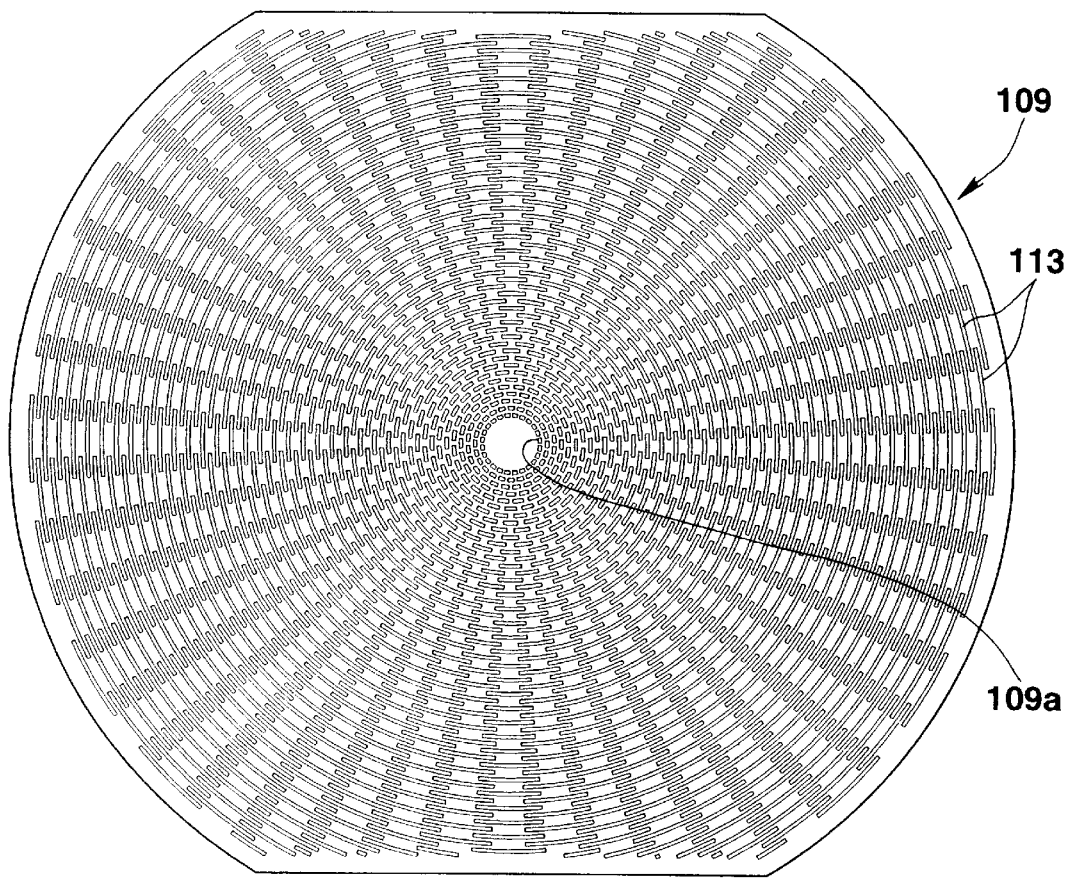
FIG. 9 is a plan view of a display plate provided with another type of outgoing openings therein.
Figure 10:
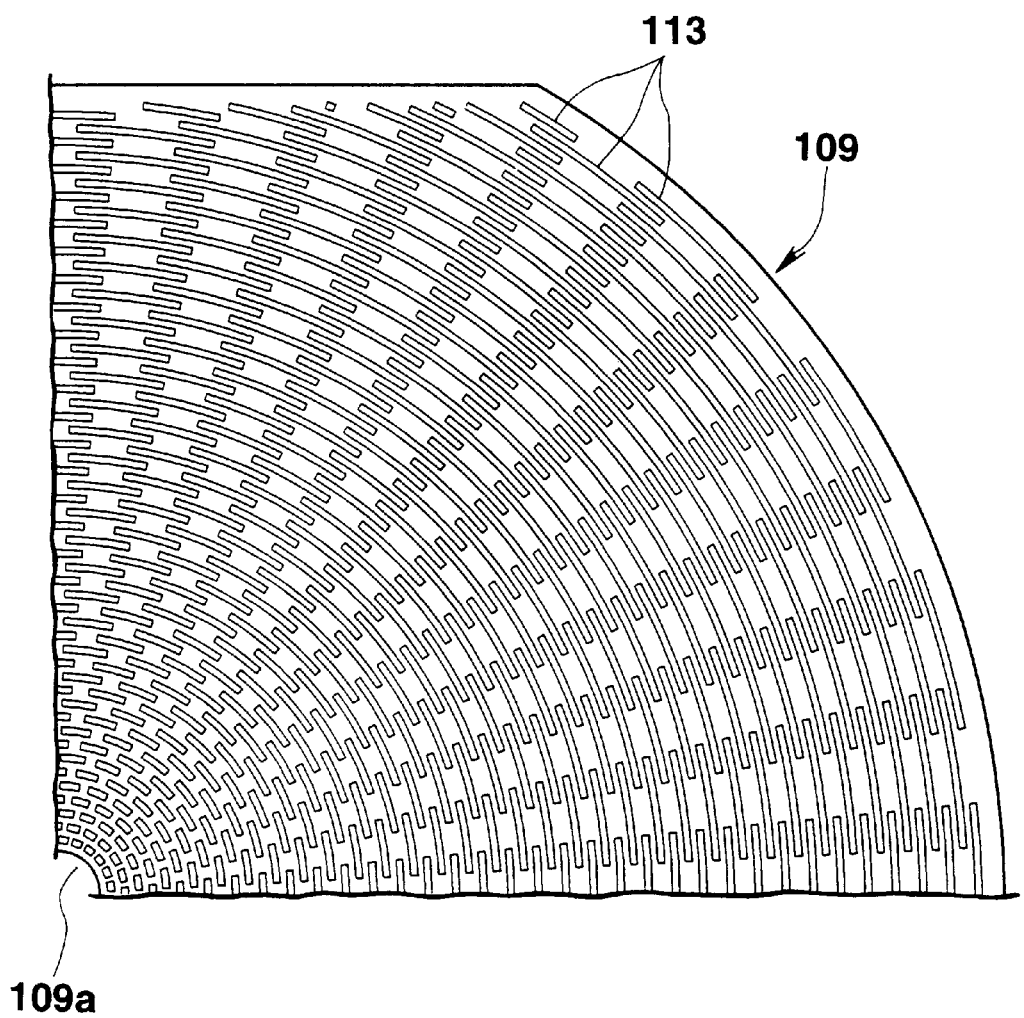
FIG. 10 is an enlarged plan view of a portion of the display plate shown in FIG. 9.

FIGS. 9 and 10 show another example of the display plate 109.

In the display plate 109, a large number of outgoing openings 113 each of which has a narrow width and a shape of arc are concentrically arranged with respect to the through hole 109a.

Even in this case, since the outgoing openings 113 communicate with an optical path which passes through the display plate 109 in its thickness direction, light emitted from the EL light emitting member 108 can be emitted therefrom, with approximately the same action as the openings shown in FIGS. 7 and 8.

The large number of outgoing openings 113 shown in FIGS. 7 to 10 are formed in a regular pattern on the upper surface of the display plate 109, and the entirety of the outgoing openings 113 forms a design for the upper surface of the display plate 109. For this reason, a fine decoration is applied to the display plate 109 and an appearance of a dial 112 as a display device is improved.

In this connection, the design made by the aforementioned outgoing openings 113 may be a pattern other than the illustrated one or a pictorial pattern.

Third Embodiment

Figure 11:
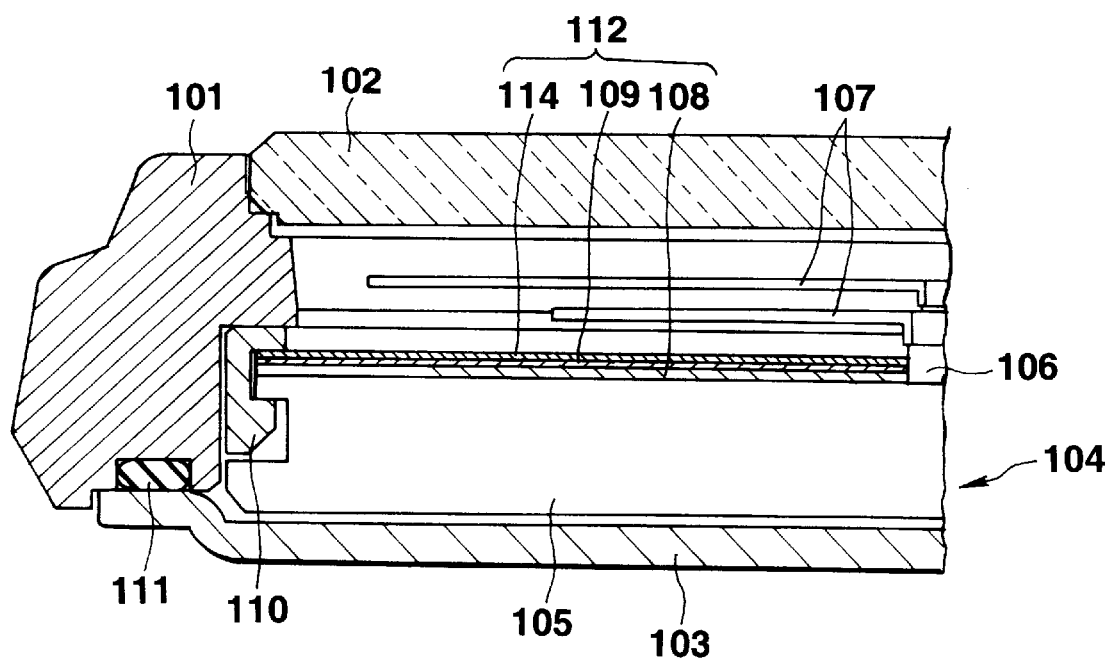
FIG. 11 is a cross-sectional view of a third embodiment of the invention.

FIG. 11 shows a third embodiment of the invention, in which the same elements as those in the foregoing second embodiment are denoted by the same reference numerals.

In the third embodiment, the display plate 109 is arranged on the EL light emitting member 108. A film member 114 is arranged on the display plate 109, thus the dial 112 is formed as a display device.

The film member 114 has a light-transmissive property and a pattern, a pictorial pattern or characters are printed on the film member to apply an additional decoration.

As the display plate 109, one including a large number of narrow outgoing openings 113 which form a design is used, like one as shown in FIGS. 7 to 10. When such a decorated film member 114 is arranged above the display plate 109, in addition to the design of the display plate 109, the decoration of the film member 114 can be observed, thus it is possible to improve a tastefullness and to increase a product value of the dial 112.

In this connection, the film member 114 may be a color film having a light-transmissive property and when such a film is used, a color metallic impression can be given.

Fourth Embodiment

Figure 12:
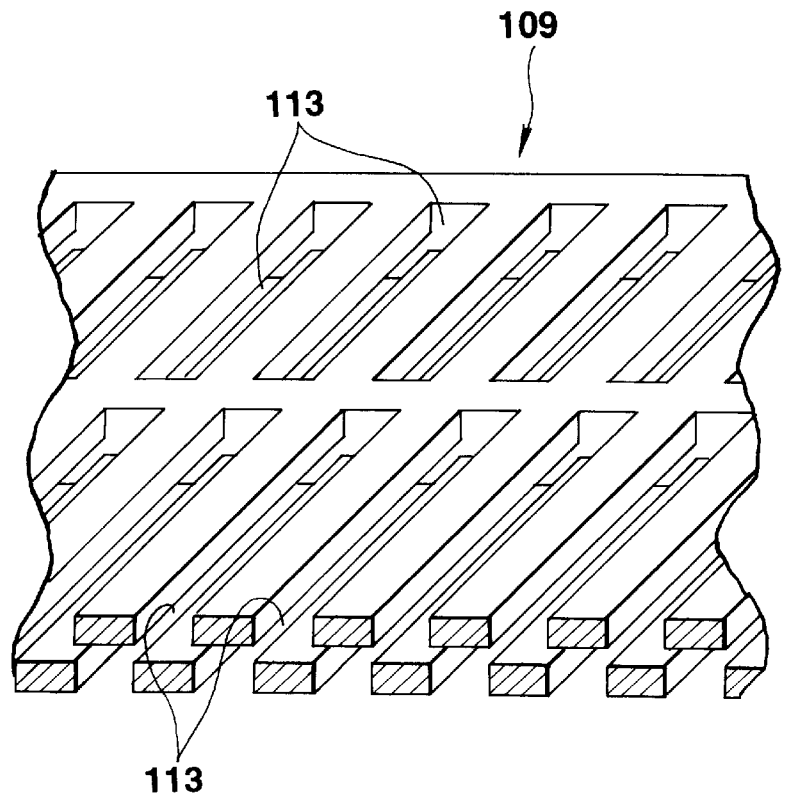
FIG. 12 is a perspective view of a fourth embodiment of the invention.

FIGS. 12 and 13 show a fourth embodiment of the invention.

In the fourth embodiment, the display plate 109 arranged above the EL light emitting member 108 is fully made of metal, and a lot of slit-like outgoing openings 113 are made in the upper surface of the display plate in a multi-row shape.

Blind walls 115 are provided within the display plate 109 at positions corresponding to the outgoing openings 113. The blind walls 115 form a part of the display plate 109 and thus the blind walls 115 are made of metal.

In this way, when the blind walls 115 made of metal are provided in the interior of the display plate 109 at positions corresponding to the outgoing openings 113, the metal can be seen also from the outgoing openings 113, whereby the entirety of the display plate 109 can be perceived as the metal and thus a metallic impression can be given thereto.

Further, since a slit-like opening is made between the adjacent blind walls 115 as in the outgoing openings 113, the openings also form incoming openings 116 which face to the EL light emitting member 108.

Figure 13A:
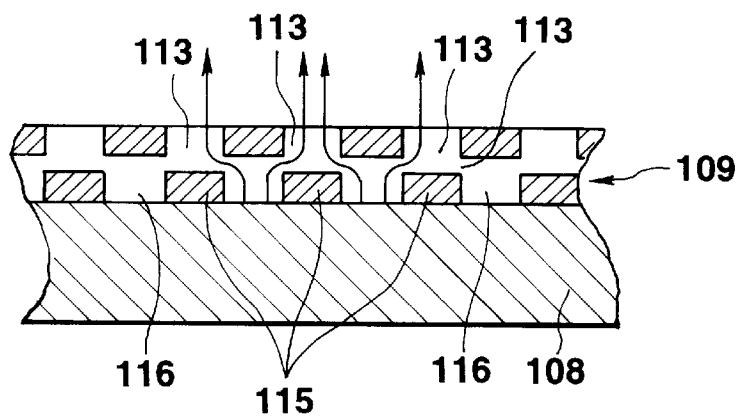
FIG. 13A is a cross-sectional view of FIG. 12.

A zig-zag optical path 117 is formed in the interior of the display plate 109 to optically connect the incoming openings 116 and the outgoing openings 113, as shown in FIG. 13A. As a result, light emitted from the EL light emitting member 108 reaches the outgoing openings 113 from the incoming openings 116 through the optical path 117 and then exits upwardly from the outgoing openings 113, as shown by arrows in FIG. 13A.

Since the emission of the light enables the display plate 109 to be brightened, time reading can be performed in total darkness.

Formation of the outgoing openings 113 and the incoming openings 115 positionally shifted in such an embodiment can be carried out by half-etching the display plate 109.

That is, the display plate 109 is subjected from its upper surface to a half-etching process to form the outgoing openings 113 and thereafter, subjected from its lower surface to the half-etching process to form the incoming openings 116 positionally shifted from the outgoing openings 113.

In the half-etching from the upper and lower surfaces, the amount of etching is overlapped to prepare the zig-zag optical path 117 communicating with the incoming and outgoing openings 113 and 116.

Modification Example

Figure 13B:
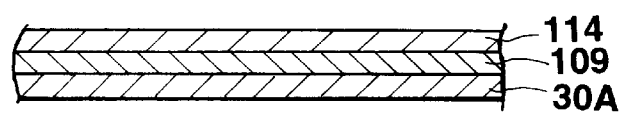
FIG. 13B shows an example of layered structure of the liquid crystal display member and the like of FIG. 11.

FIG. 13B shows a modification example in which a solar battery member 30A is disposed at a position lower than that of the display plate 109.

This can be realized by replacing the EL light emitting member 108 in FIG. 6 with the solar battery member 30A. In this case, the display plate 109 is similar in structure to that in the foregoing embodiment, but different in that the outgoing openings 113 function as light incoming openings and light incidence causes the solar battery member 30A to perform its photoelectric conversion to thereby supply its power to parts in the watch.

Even in this case, when the outgoing openings 113 are made narrow, an upscale look can be given to the display plate 109 without deteriorating the metallic impression of the display plate 109.

Fifth Embodiment

Figure 14:
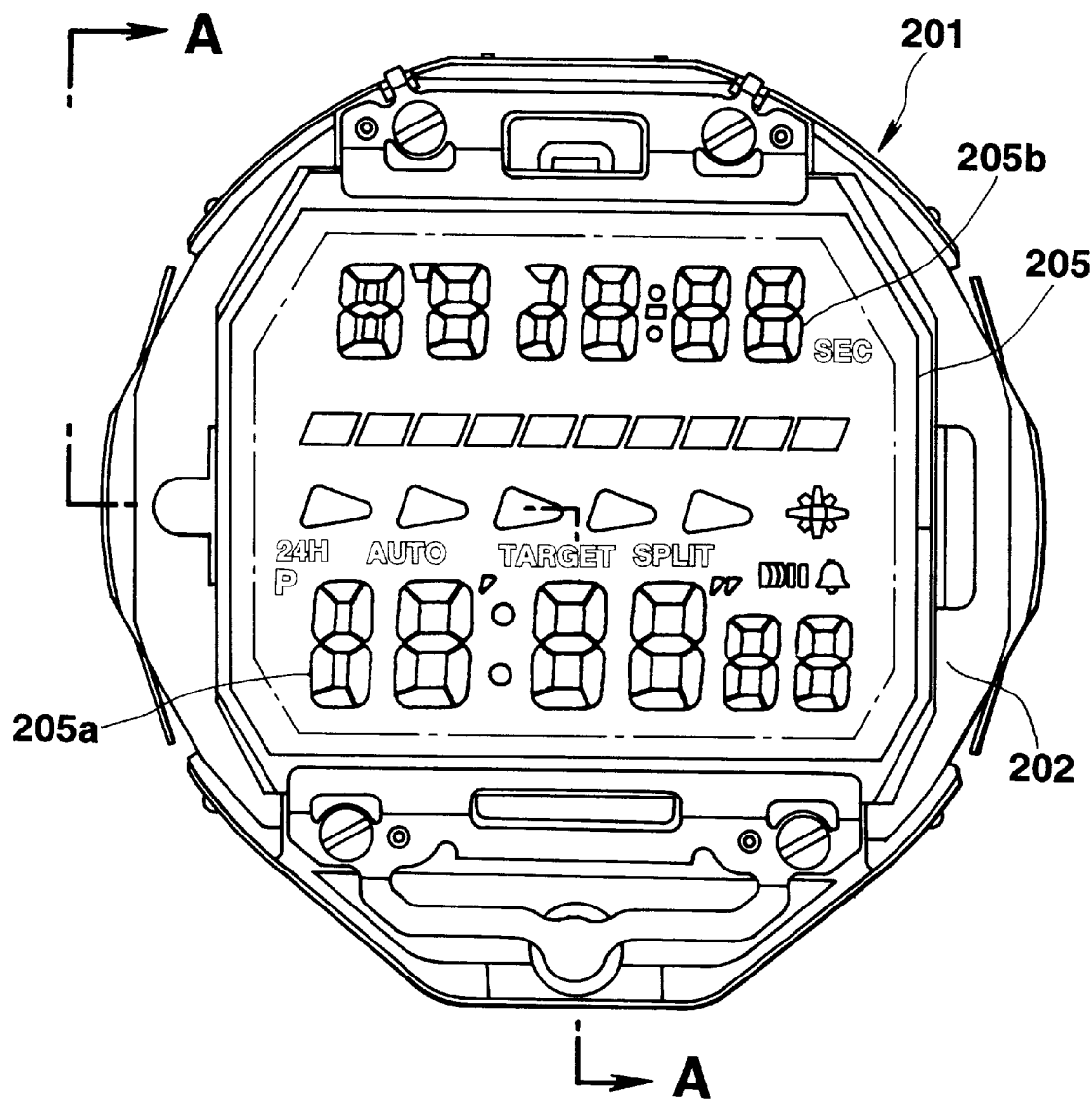
FIG. 14 is a plan view of a fifth embodiment of the invention.
Figure 15:
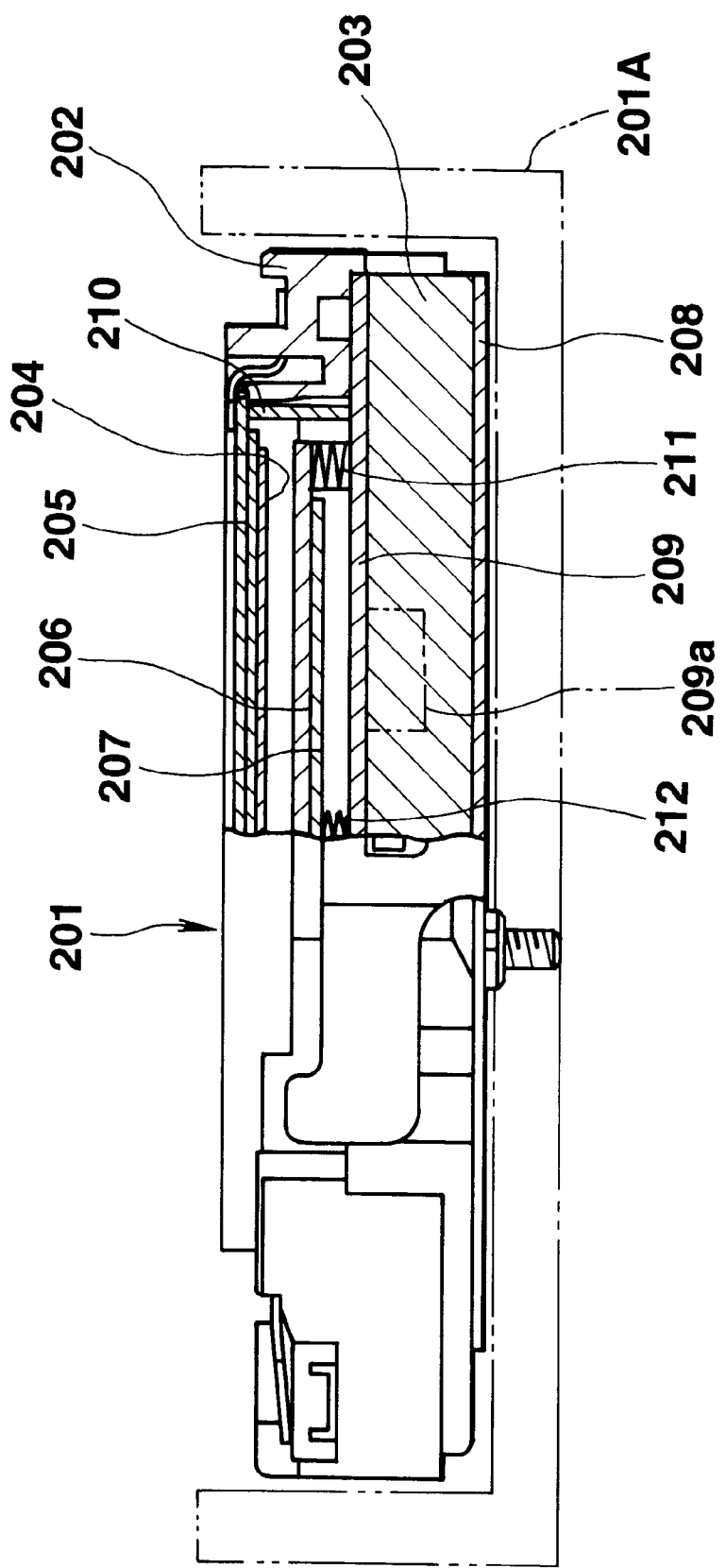
FIG. 15 is a cross-sectional view taken along the line A—A of FIG. 14.

FIGS. 14 to 17 show a fifth embodiment of the present invention which is applied to a digital electronic watch, in which FIG. 14 is a plan view of the watch module and FIG. 15 is a cross-sectional view taken along the line A—A in FIG. 14.

A watch module 201, which is mounted within a watch case 201A (not shown) functioning as an apparatus case to display a time or other information, comprises upper and lower housings 202 and 203 made of a plate-like synthetic resin material. In order to form the watch case 201A, between the upper housing 202 having notches and openings therein and the lower housing 203, a liquid crystal display member 205 as a display member, a solar battery member 206, an EL light emitting member 207 for illuminating the liquid crystal display member 205, and other electronic members, are incorporated.

The upper housing 202 and the lower housing 203 are assembled by engaging a main plate 208 with the upper and lower housings 202 and 203. This assembling is carried out so that a circuit board 209 having such an electronic circuit as an LSI is fixed as held between the housings.

As shown in FIG. 14, the liquid crystal display member 205 is arranged to have a time display part 205a for display of a time based on 7 segments and an information display part 205b for display of a measured time of a stop watch based on 7 segments, which are divided in upper and lower parts in plan. The time display part 205a and the information display part 205b display a plurality of pieces of necessary information individually, simultaneously or selectively.

The liquid crystal display member 205, which is a light-transmissive type of liquid crystal display member, is constructed to transmit light except for the display segments, as shown in FIG. 15. This light-transmissive structure can be attained by making a pair of substrates filled with liquid crystal as transparent substrates and by using polarizing plates (not shown) stacked on upper and lower surfaces of the pair of transparent substrates.

Under the lower polarizing plate, a translucent reflecting plate 204 is arranged.

On the lower surface of the periphery of the liquid crystal display member 205, a pattern electrode (not shown) is formed. The pattern electrode is connected with a pattern electrode (not shown) led out from an electronic circuit of the circuit board 209 through an interconnector 210 as an electric connecting member. Thus, display of the liquid crystal display member 205 can be controlled by the electronic circuit of the circuit board 209.

Each of the solar battery member 206 and the EL light emitting member 207 are formed in a plate shape. Further, the solar battery member 206 and EL light emitting member 207 are stacked in a vertical direction and are disposed at positions lower than that of the liquid crystal display member 205.

In this embodiment, the solar battery member 206 is stacked with the EL light emitting member 207 so that the solar battery member 206 is positioned at the upper side while the EL light emitting member 207 is at the lower side.

The solar battery member 206 receives light propagated into the watch case 201A, generates power through its photoelectric converting operation, and supplies the power to electronic members within the watch module 201.

For the purpose, a spring 211 made of electrically conductive metal is used as a connecting member, and the solar battery member 206 is electrically connected to the electronic circuit part 209a of the circuit board 209 through the coil spring 211.

The electronic circuit 209a of the circuit board 209 includes a capacitor or such a storage circuit (not shown) as a secondary battery member, for storing the supplied power from the solar battery member 206 therein. The power is supplied from the storage circuit to the respective members including the EL light emitting member 207.

The EL light emitting member 207 emits light according to the power received from the electronic circuit 209a of the circuit board 209 and illuminates the liquid crystal display member 205 with the emitted light from its lower side.

This illumination enables the liquid crystal display member 205 to be brightened, thus making it possible for the user to read information in nighttime or in total darkness.

Electric connection between the EL light emitting member 207 and the circuit board 209 is carried out by inserting a connecting piece 212 made of electrically conductive metal between the EL light emitting member 207 and the circuit board 209.

Figure 16A:
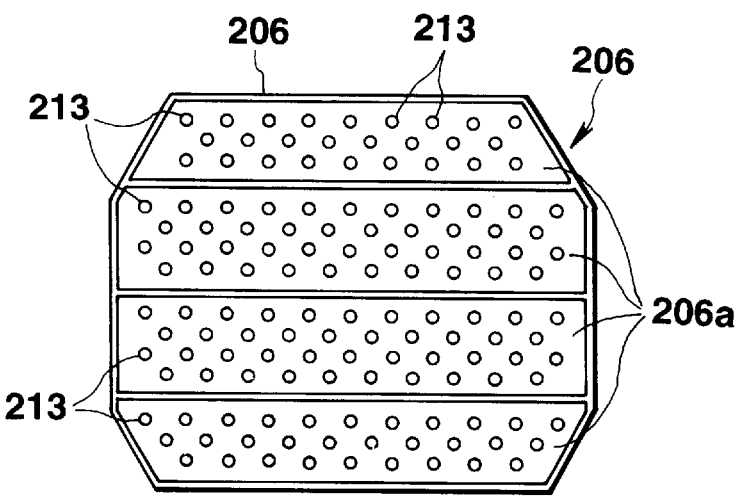
FIG. 16A is a plan view of a solar battery member in the fifth embodiment of the invention.
Figure 16B:
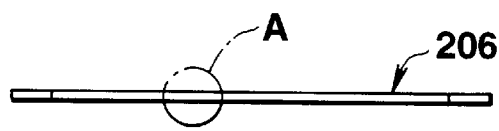
FIG. 16B is a front view of the solar battery member shown in FIG. 16A.
Figure 16C:
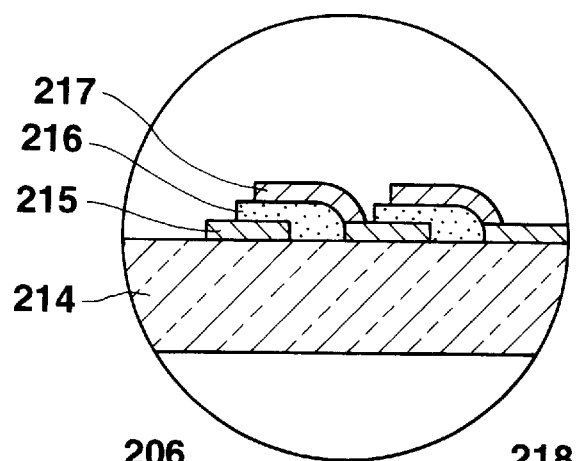
FIG. 16C is an enlarged cross-sectional view of the portion "A" of the solar battery member shown in FIG. 16B.
Figure 16D:
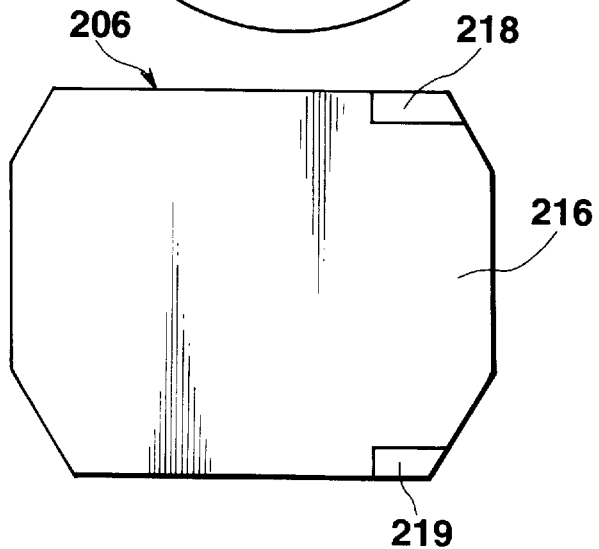
FIG. 16D is a bottom view of the solar battery member shown in FIG. 16A.

FIGS. 16A to 16C show the solar battery member 206. FIG. 16A shows a light receiving surface of the solar battery member 206 and FIG. 16C shows a resin substrate 214 of the solar battery member 206.

The light receiving surface of the solar battery member 206 is positioned on the side of the liquid crystal display member 205 and the resin substrate 214 is positioned on the side of the EL light emitting member 207.

The light receiving surface, as shown in FIG. 16A, has a plurality of battery cells 206a which are divided, so that its photoelectric converting operation is carried out by the battery cells 206a receiving light.

The entirety of the battery cell 206a has a plate-like shape, as shown in FIG. 16B. The battery cell 206a, as shown by an enlarged view of FIG. 16C, comprises the resin substrate 214 having a pattern-formed first electrode layer 215 formed on the surface thereof, and an amorphous silicon layer 216 formed on the first electrode layer 215.

The amorphous silicon layer 216, which functions to perform its photoelectric converting operation in response to a light reception, is stacked on the resin surface 214 and is in contact with the adjacent first electrode layer 215, and a second electrode layer 217 is stacked on the first electrode layer 216. The second electrode layer 217 is made conductive with the first electrode layer 215 by overlapping on the first electrode layer 215, and thereby a current generated through the above photoelectric conversion can be extracted.

In FIG. 16C, reference numerals 218 and 219 denote output terminals formed at ends of the surface of the resin substrate 214. The output terminals 218 and 219, are for supplying power to the circuit board 209 when the coil spring 211 (refer to FIG. 15) is brought into contact with the output terminals 218 and 219.

In the battery cells 206a, as shown in FIG. 16A, a plurality of light passage holes 213 having a small diameter which are openings passed therethrough, are formed so that light can pass through the light passage holes 213.

Further, the resin substrate 214 supporting the battery cells 206a, which comprises a transparent member, can pass therethrough light received from the EL light emitting member 207 disposed at the lower position.

Figure 17:
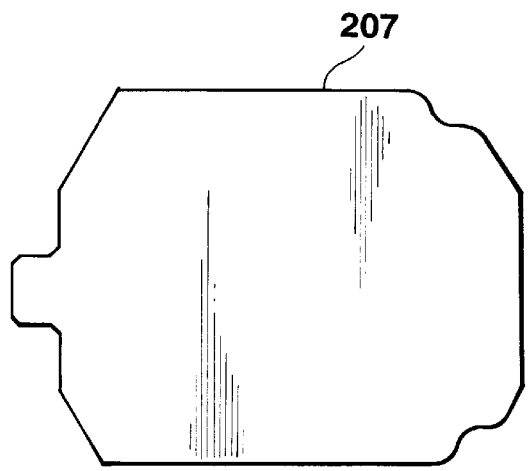
FIG. 17 is a plan view of an EL light emitting member in the fifth embodiment of the invention.

The light passed through the resin substrate 214 passes through the light passage holes 213 and exits upward from the solar battery member 206 and diffuses. FIG. 17 shows the EL light emitting member 207 which is formed to have approximately the same shape as the solar battery member 206.

In such an embodiment, because the liquid crystal display member 205 is light-transmissive and thus light reaches the solar battery member 206 disposed at a lower position, the solar battery member 206 can perform its photoelectric converting operation.

The power generated through the photoelectric conversion is stored in the electronic circuit part 209a of the circuit board 209, and in response to an input of a control signal to the electronic circuit part of the circuit board 209, the stored power is supplied to the EL light emitting member 207 from the electronic circuit part 209a of the circuit board 209 to cause light emission by the EL light emitting member 207.

The light, as already explained above, is diffused upward from the plurality of light passage holes 213 of the solar battery member 206, thereby illuminating the light-transmissive liquid crystal display member 205. As a result, the user can read information in nighttime or in total darkness.

In this embodiment, as explained above, even when the solar battery member 206 is disposed at a position lower than that of the liquid crystal display member 205, good photoelectric conversion can be carried out.

Further, even when the EL light emitting member 207 is disposed at a position lower than that of the solar battery member 206, the emitted light can be guided into the liquid crystal display member 205 to illuminate it.

Accordingly, arrangement of the solar battery member 206 and the liquid crystal display member 205 in parallel is not required, therefore a wide display area for the liquid crystal display member 205 can be secured, and thereby information reading can be facilitated.

In addition, since the solar battery member 206 is disposed at a position lower than that of the liquid crystal display member 205 and is not exposed, the watch can be improved in its appearance and can reinforce the flexibility of design.

Sixth Embodiment

Figure 18:
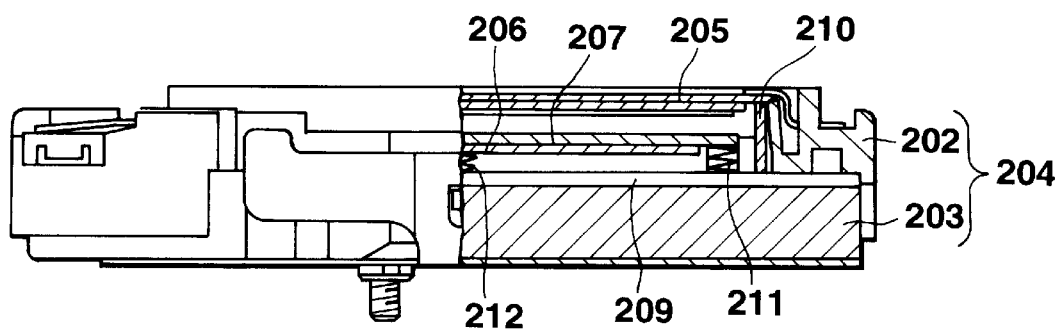
FIG. 18 is a cross-sectional view of a sixth embodiment of the invention.
Figure 19:
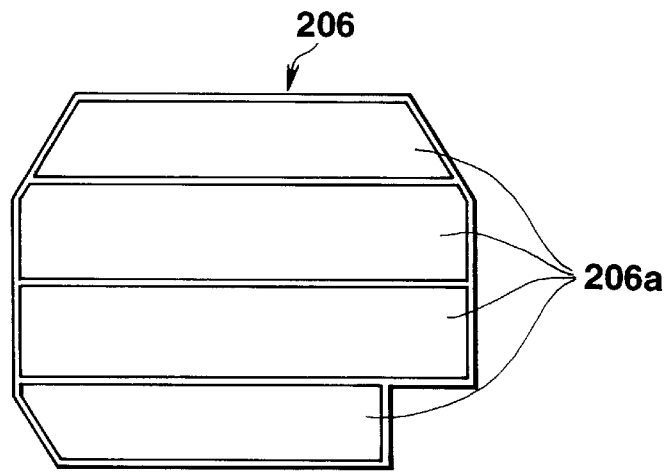
FIG. 19 is a plan view of the solar battery member in the sixth embodiment of the invention.
Figure 20:
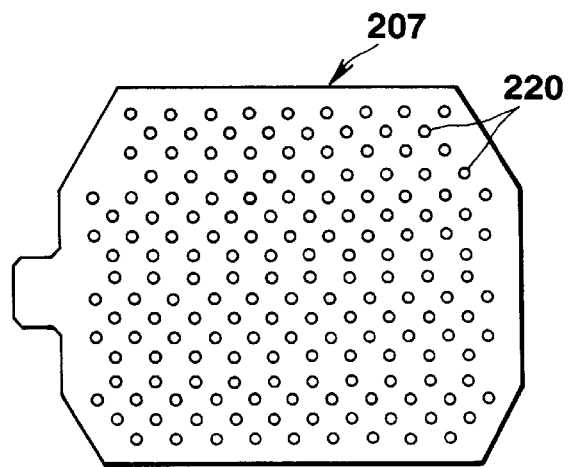
FIG. 20 is a plan view of an EL light emitting member in the sixth embodiment of the invention.

FIGS. 18 to 20 show a sixth embodiment of the invention, in which the same elements as those in the fifth embodiment (FIGS. 15 to 17) are denoted by the same reference numerals.

In this embodiment, as shown in FIG. 18, the EL light emitting member 207 and the solar battery member 206 are stacked so that the EL light emitting member 207 is disposed at an upper position and the solar battery member 206 is disposed at a lower position, and these members are disposed at a lower position than that of the light-transmissive liquid crystal display member 205.

FIG. 19 shows the solar battery member 206 which has a plurality of divided battery cells 206a and which is the same in structure as FIG. 16, except that the light passage holes 213 are not formed therein.

FIG. 20 shows the EL light emitting member 207 disposed above the solar battery member 206, wherein the EL light emitting member is formed with a plurality of light passage holes 220 having a small diameter, which are openings and passes therethrough.

Light advanced into the watch case 204A passes through the light passage holes 220, reaches the solar battery member 206, and are received by the solar battery member 206 for its photoelectric conversion.

In this embodiment, the EL light emitting member 207 is positioned just under the liquid crystal display member 205 so that light emission of the EL light emitting member 207 causes illumination of the liquid crystal display member 205.

On the other hand, since the liquid crystal display member 205 is light-transmissive, external light passes through the liquid crystal display member 205 and reaches the EL light emitting member 207.

Since the EL light emitting member 207 is formed with the plurality of light passage holes 220, the light reaches the solar battery member 206 disposed at the lower position, whereby the solar battery member 206 can perform its photoelectric converting operation. Accordingly, even when the EL light emitting member 207 is positioned on the upper side and the solar battery member 206 is positioned on the lower side, similar actions can be attained as in the first or fifth embodiment.

Seventh Embodiment

FIGS. 21 to 25 show a seventh embodiment of the invention, in which the present invention is applied to an analog electronic watch.

Figure 21:
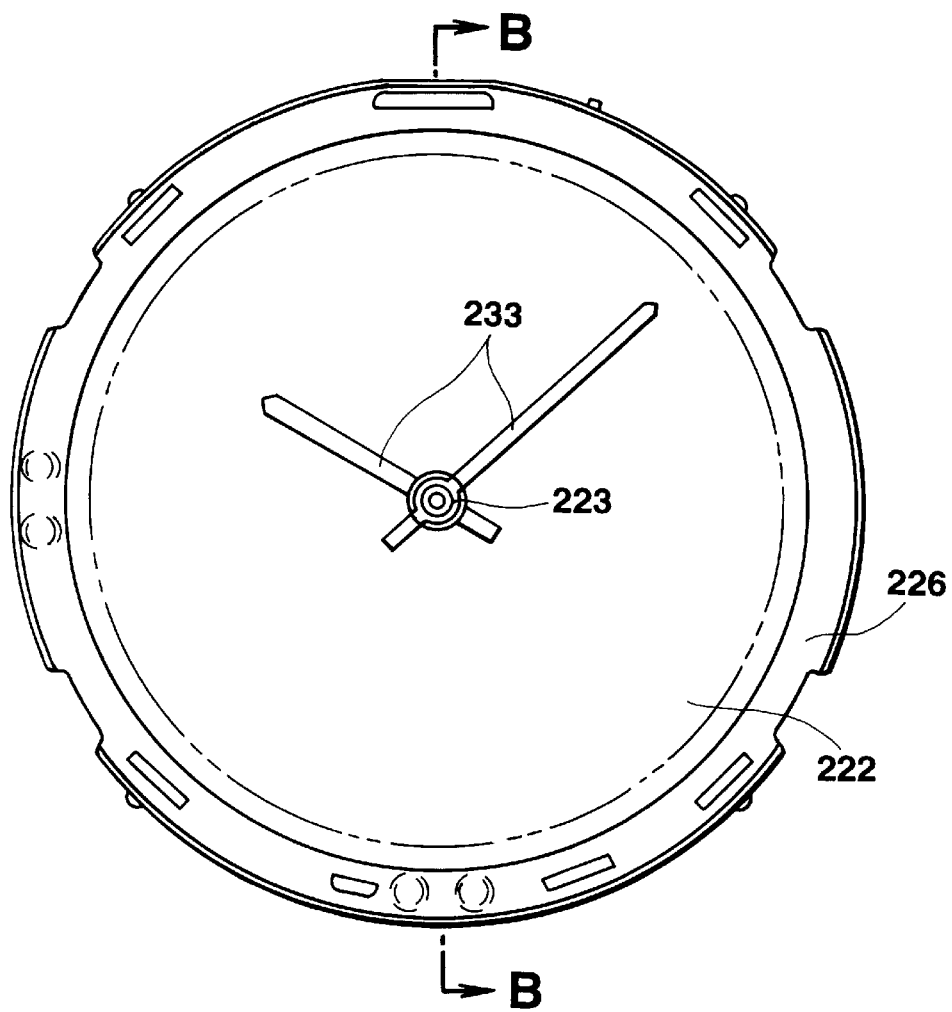
FIG. 21 is a plan view of a seventh embodiment of the invention.
Figure 22:
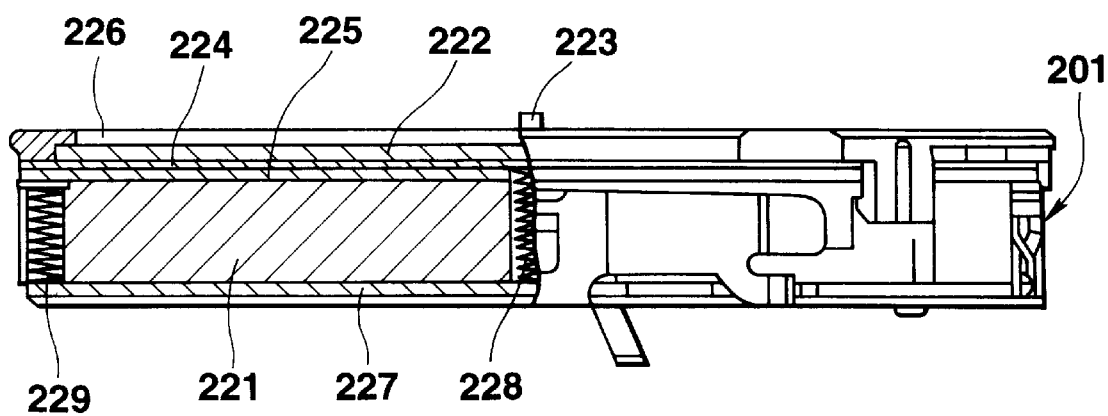
FIG. 22 is a cross-sectional view taken along the line B—B of FIG. 21.

As shown in FIGS. 21 and 22, the watch module 201 has an analog hand mechanism 221 incorporated therein.

The analog hand mechanism 221 has a dial 222 and a hand shaft 223 which passes through the central portion of the dial 222. To the hand shaft 223, hands 233 including hour and minute hands are attached so that the hands 233 are rotated above the dial 222 to indicate a time.

The dial 222 in the analog hand mechanism 221 is made of a light-transmissive material, for example, a translucent film or the like, to pass external light therethrough.

Below the dial 222, a solar battery member 224 and an EL light emitting member 225, each having a plate shape, are arranged in a stacked state.

In the present embodiment, the solar battery member 224 is located on the upper side and the EL light emitting member 225 is located on the lower side.

These members 224 and 225 are formed to have a diameter larger than that of the dial 222. The peripheral portion of each of the members 224 and 225, which extends outwardly exceeding the outline of the dial 222 is prevented from tending to rise by bringing a ring-shaped holding member 226 into contact with the periphery of the members.

Further, on the lower surface of the analog hand mechanism 221, a circuit board 227 is disposed. The circuit board 227 is electrically connected with the solar battery member 224 through a coil spring 228 made of conductive metal, and the circuit board 227 is electrically connected with the EL light emitting member 225 through a coil spring 229 made of conductive metal.

By such electric connections, power from the solar battery member 224 is input to the circuit board 227 and stored therein, while the EL light emitting member 225 can emit light under control of the circuit board 227.

FIG. 23 shows the solar battery member 224, in which the same elements as those in FIGS. 16A to 16D are denoted by the same reference numerals to avoid duplicated explanation.

That is, the solar battery member 224 comprises the transparent resin substrate 214; and the first electrode layer 215, the amorphous silicon layer 216 and the second electrode layer 217 which are sequentially formed on the resin substrate 214. On the surface of the resin substrate 214, the output terminals 218 and 219 to be connected with the circuit board 227 are formed.

Figure 23A:
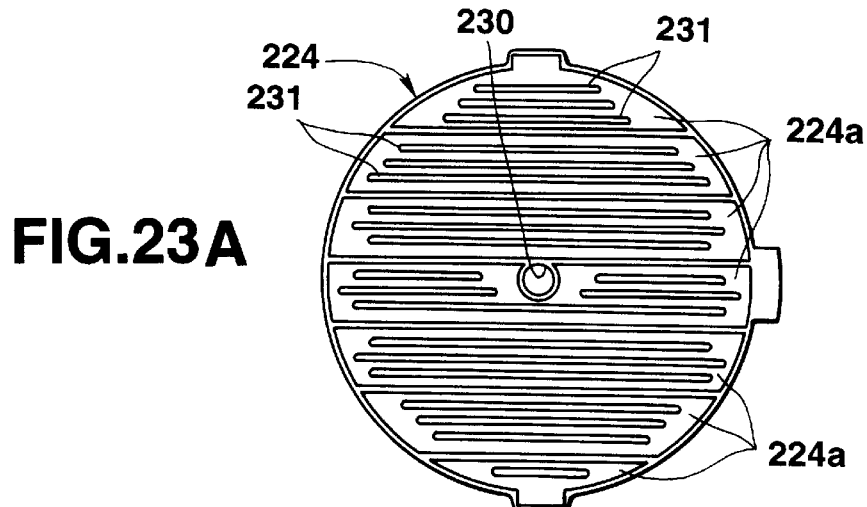
FIG. 23A is a plan view of the solar battery member in the seventh embodiment of the invention.
Figure 23B:
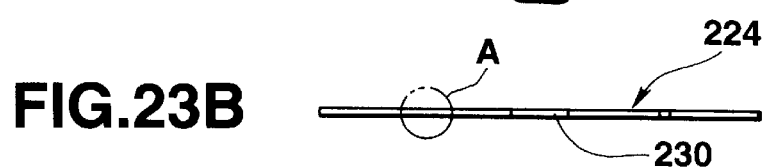
FIG. 23B is a front view of the solar battery member shown in FIG. 23A.
Figure 23C:
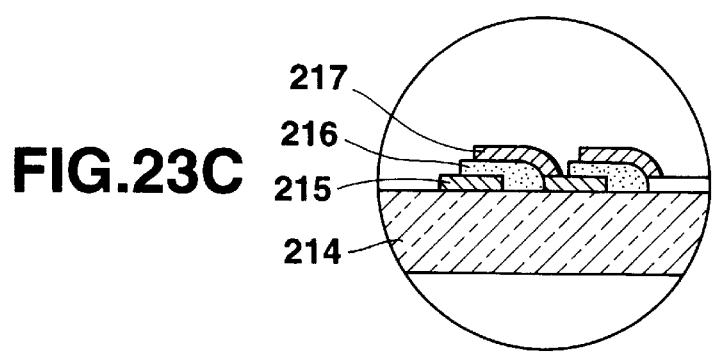
FIG. 23C is an enlarged cross-sectional view of the portion "A" of the solar battery member shown in FIG. 23B.
Figure 23D:
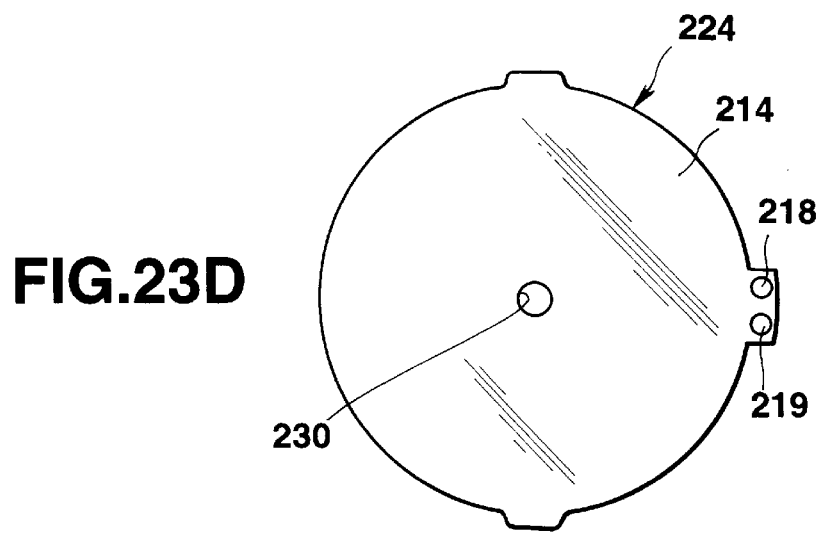
FIG. 23D is a bottom view of the solar battery member shown in FIG. 23A.

On the upper surface of the solar battery member 224, as shown in FIG. 23A, a plurality of divided battery cells 224a for carrying out photoelectric conversion are formed. Also a shaft hole 230 through which the hand shaft 223 passes is formed in the central portion of the solar battery member 224.

In the battery cells 224a of the solar battery member 224, a plurality of light passage holes 231 which are openings are formed. Each of the light passage holes 231 has an elongated slit-shape to allow good passage of light therethrough.

Figure 24:
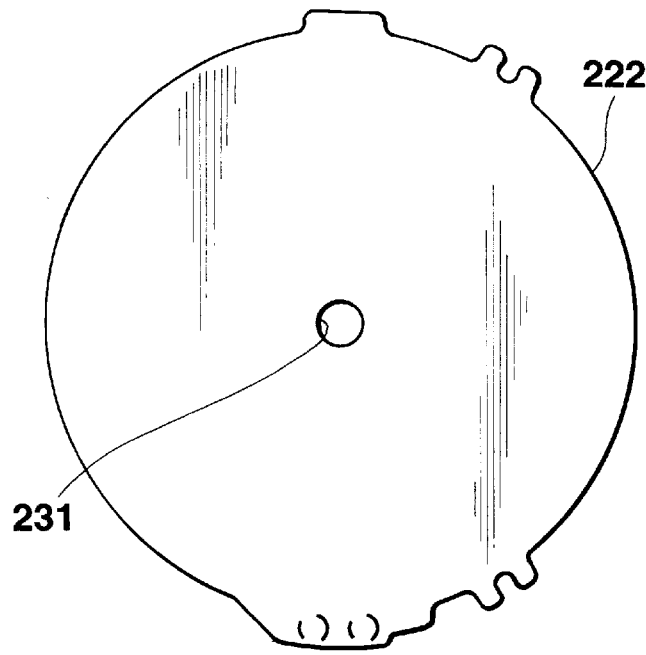
FIG. 24 is a plan view of the dial in the seventh embodiment of the invention.
Figure 25:
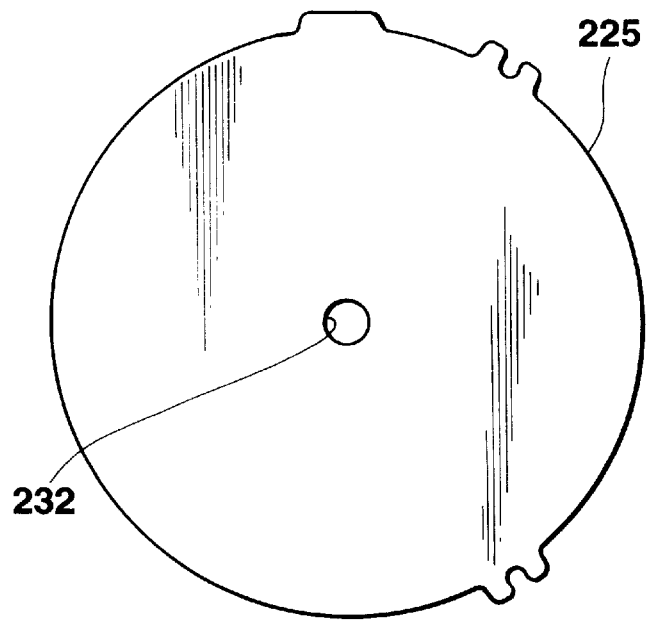
FIG. 25 is a plan view of an EL light emitting member in the seventh embodiment of the invention.

FIG. 24 shows the dial 222 and FIG. 25 shows the EL light emitting member 225, in which shaft holes 231 and 232 for passage of the hand shaft 223 are formed in the central portions of the dial 222 and EL light emitting member 225.

In this embodiment, since the dial 222 is light-transmissive, light passed through the dial 222 enters the solar battery member 224, so that the solar battery member 224 generates power through its photoelectric converting operation in response to the incident light.

On the other hand, when the EL light emitting member 225 emits light, the light passes through the resin substrate 214 of the solar battery member 224 and through the light passage holes 231, and then upwardly diffuses.

For this reason, the dial 222 is illuminated so that the user can read a time in the nighttime or in total darkness.

Therefore, in this embodiment, because the solar battery member 224 can be disposed at a position lower than that of the dial 222 and the area of the dial 222 can be made large and therefore the solar battery member 224 cannot be seen from the outside, the watch can be improved in its appearance and can reinforce the flexibility of design.

Eighth Embodiment

Figure 26:
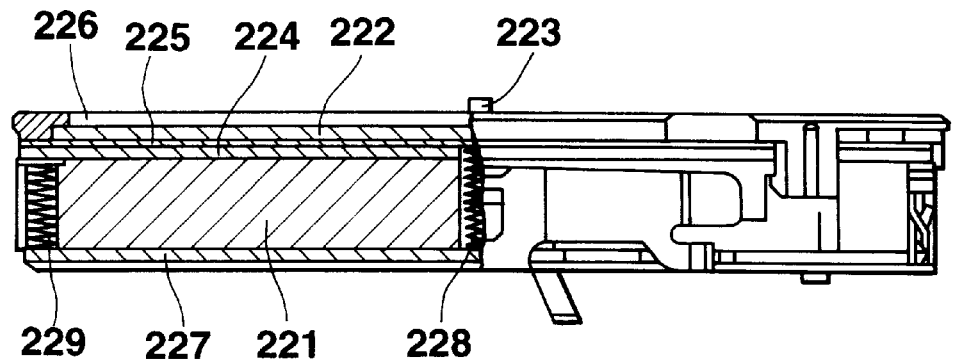
FIG. 26 is a cross-sectional view of an eighth embodiment of the invention.
Figure 27:
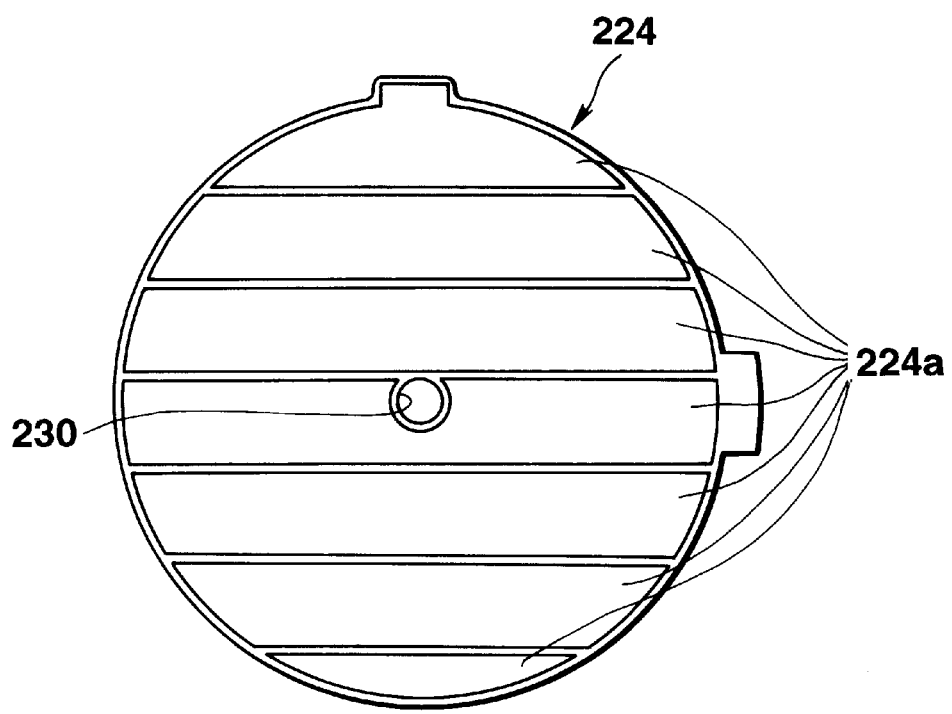
FIG. 27 is a plan view of the solar battery in the eighth embodiment of the invention.
Figure 28:
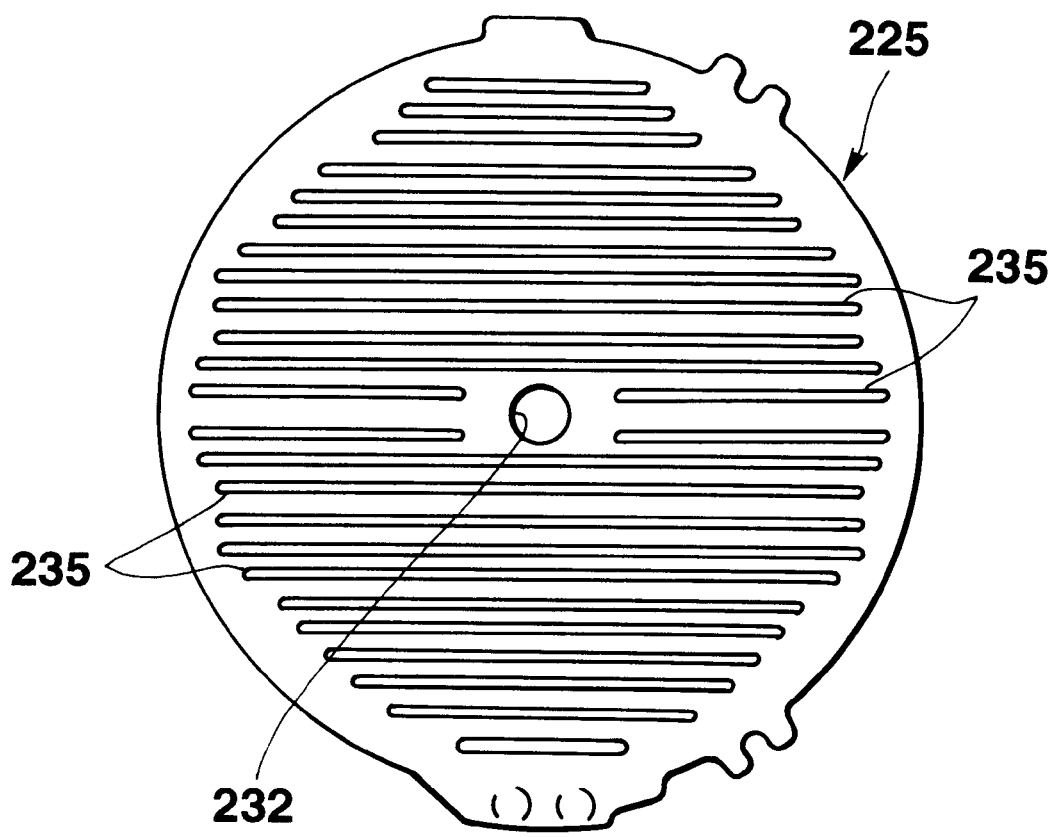
FIG. 28 is a plan view of an EL light emitting member in the eighth embodiment of the invention.

FIGS. 26 to 28 show an eighth embodiment of the invention, in which the same elements as those in the seventh embodiment are denoted by the same reference numerals.

In this embodiment, as shown in FIG. 26, the EL light emitting member 225 is stacked on the solar battery member 224 so that the EL light emitting member 225 is disposed at an upper position while the solar battery member 224 is at a lower position. Under the state, the EL light emitting member and the solar battery member are disposed below the light-transmissive dial 222.

FIG. 27 shows the solar battery member 224 which has a plurality of battery cells 224a divided therein and which has the same structure as those of FIG. 23, except that the light passage holes 231 are not formed.

FIG. 28 shows the EL light emitting member 225 disposed above the solar battery member 224, and in the EL light emitting member, a plurality of elongated slit-like light passage holes 235 which are openings and passes therethrough, are formed.

In this embodiment, the EL light emitting member 225 is positioned just under the dial 222 so that emitted light from the EL light emitting member 225 causes illumination of the dial 222.

Because of the light-transmissive dial 222, external light can be passed through the dial 222 and reach the EL light emitting member 225.

Since the EL light emitting member 225 is formed with a plurality of light passage holes 235, light reaches the solar battery member 224 located at a lower position and thus the solar battery member 224 can perform its photoelectric converting operation.

Accordingly, even when the EL light emitting member 225 is disposed at an upper position and the solar battery member 224 is disposed at a lower position, as described above, the present embodiment can exhibit approximately the same function as the seventh embodiment.

Although the resin substrate of the battery cells 206a or 224a of the solar battery member 206 or 224 has been light-transmissive, an opaque resin may be also used. In the latter case, when the resin substrate is formed with through holes which communicate with the light passage holes 213 or 231 of the battery cells 206a or 224a, the same operation can be realized.

Further, a plate-shaped light emitting member other than the EL light emitting member may be employed.

Although the explanation has been made in connection with the electronic watch in the foregoing respective embodiments, the present invention is not restricted to this and may be applied to an electronic pocket notebook or other electronic apparatuses.

Further, although the EL light emitting member has been of the plate shaped in the above embodiments, another light emitting member may be employed.

Furthermore, although the display panel has been described as being of the liquid crystal type in the above embodiments, another display member maybe employed. Other detailed structures may be also modified as necessary, as a matter of course.

As explained above, in accordance with the invention, because the solar battery member having a lot of openings for passing light therethrough are disposed between the transparent touch panel or the liquid crystal display member and the light emitting member, it is possible to visually recognize the indication on the upper surface of the transparent touch panel or the display content of the liquid crystal display member clearly from the outside, of course in daytime, and even in the nighttime and in total darkness. Because the apparatus according to the invention has a structure in which the transparent touch panel or the liquid crystal display member, the solar battery member having a lot of openings for passing light therethrough, and the light emitting member are layered on one another, it is possible to make the whole apparatus small-sized. Even when a black solar battery member is used, because the solar battery member is disposed at a position lower than that of the transparent touch panel or the liquid crystal display member, the solar battery member is not exposed to the surface of the apparatus and it is possible also to improve the design of the device or the apparatus.

What is claimed is:

1. A display device comprising:
   a plate-like EL light emitting member; and
   a display plate disposed above the EL light emitting member, and having a plurality of openings formed therein which form a pattern and introduce light emitted from the EL light emitting member out of the display plate.

2. A display device as claimed in claim 1, wherein a time character or other character for indicating time is formed on an upper surface of the display plate.

3. A display device as claimed in claim 1, wherein at least an upper surface of the display plate is made of metal.

4. A display device as claimed in claim 1, wherein a whole of the display plate is made of metal.

5. A display device as claimed in claim 1, wherein a light-transmissive member is disposed above the display plate.

6. A display device comprising:
   a device body;
   a plate-like EL light emitting member disposed in the device body;
   a display plate disposed above the EL light emitting member; and
   a fixing member for fixing the display plate and the EL light emitting member to the device body;
   wherein the display plate has a plurality of openings formed therein which form a pattern and introduce light emitted from the EL light emitting member out of the display plate.

7. A display device as claimed in claim 6, wherein a time character or other character for indicating time is formed on an upper surface of the display plate.

8. A display device as claimed in claim 6, wherein at least an upper surface of the display plate is made of metal.

9. A display device as claimed in claim 6, wherein a whole of the display plate is made of metal.

10. A display device as claimed in claim 6, wherein a light-transmissive member is disposed above the display plate.

11. An analog timepiece comprising:
    a timepiece body;
    a plate-like EL light emitting member disposed in the timepiece body;
    a display plate disposed above the EL light emitting member; and
    an analog hand mechanism having a hand shaft for driving a rotatable hand above the display plate;
    wherein the display plate has a plurality of openings formed therein which form a pattern and introduce light emitted from the EL light emitting member out of the display plate.

12. A display device as claimed in claim 11, wherein a time character or other character for indicating time is formed on an upper surface of the display plate.

13. A display device as claimed in claim 11, wherein at least an upper surface of the display plate is made of metal.

14. A display device as claimed in claim 11, wherein a whole of the display plate is made of metal.

15. A display device as claimed in claim 11, wherein a light-transmissive member is disposed above the display plate.

* * * * *